United States Patent
Park et al.

(10) Patent No.: US 12,298,381 B2
(45) Date of Patent: May 13, 2025

(54) MONOSTATIC RADAR WITH PROGRESSIVE LENGTH TRANSMISSION

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Junyi Li, Fairless Hills, PA (US); Juan Montojo, San Diego, CA (US); Jing Sun, San Diego, CA (US); Xiaoxia Zhang, San Diego, CA (US); Peter Gaal, San Diego, CA (US); Taesang Yoo, San Diego, CA (US); Simone Merlin, San Diego, CA (US); Srinivas Yerramalli, Hyderabad (IN); John Edward Smee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 17/364,307

(22) Filed: Jun. 30, 2021

(65) Prior Publication Data

US 2022/0003859 A1  Jan. 6, 2022

Related U.S. Application Data

(60) Provisional application No. 63/046,895, filed on Jul. 1, 2020.

(51) Int. Cl.
*G01S 13/56* (2006.01)
*G01S 7/03* (2006.01)
(Continued)

(52) U.S. Cl.
CPC .............. *G01S 13/56* (2013.01); *G01S 7/034* (2013.01); *G01S 7/352* (2013.01); *G01S 2013/0245* (2013.01)

(58) Field of Classification Search
CPC ... G01S 13/56; G01S 7/034; G01S 2013/0245
See application file for complete search history.

(56) References Cited

U.S. PATENT DOCUMENTS

| 4,005,420 A * | 1/1977 | McDonald | G01S 13/325 342/119 |
|---|---|---|---|
| 2011/0187579 A1 * | 8/2011 | Asada | G01S 13/30 375/295 |

(Continued)

FOREIGN PATENT DOCUMENTS

EP  1839071  * 10/2007

OTHER PUBLICATIONS

Mahafza, "Radar System Analysis and Design using Matlab", Chapter 7, Chapman & Hall/CRC, ISBN 1-58488-182-8 (Year: 2000).*

(Continued)

*Primary Examiner* — Timothy A Brainard
*Assistant Examiner* — Helena H Seraydaryan
(74) *Attorney, Agent, or Firm* — Thien T. Nguyen

(57) ABSTRACT

Monostatic radar with progressive length transmission may be used with half-duplex systems or with full-duplex systems to reduce self-interference. The system transmits a first signal for a first duration and receives a first reflection of the first signal from a first object during a second duration. The system transmits a second signal for a third duration longer than the first duration and receives a second reflection of the second signal from a second object during a fourth duration. The system calculates a position of the first object and the second object based on the first reflection and the second (Continued)

reflection. The first signal, first duration, and second duration are configured to detect reflections from objects within a first distance of the system. The second signal, third duration, and fourth duration are configured to detect reflections from objects between the first distance and a second distance from the system.

30 Claims, 12 Drawing Sheets

(51) Int. Cl.
*G01S 7/35* (2006.01)
*G01S 13/02* (2006.01)

(56) References Cited

U.S. PATENT DOCUMENTS

| | | |
|---|---|---|
| 2011/0279307 A1 | 11/2011 | Song |
| 2013/0235366 A1* | 9/2013 | Giacotto ............... G01S 17/10 356/5.01 |
| 2018/0348353 A1* | 12/2018 | Lien ...................... G01S 7/023 |
| 2019/0018107 A1* | 1/2019 | Warke ..................... G01S 17/10 |
| 2019/0170868 A1* | 6/2019 | Hanisch ................. G01S 13/22 |
| 2019/0293748 A1* | 9/2019 | Gulati ................. H04W 74/004 |
| 2020/0124705 A1* | 4/2020 | Buonocore ......... G01S 13/0209 |

OTHER PUBLICATIONS

International Search Report and Written Opinion—PCT/US2021/040049—ISA/EPO—Nov. 3, 2021.

Mahafza B.R., et al., "Pulse Compression", Chapter 7, Radar Systems Analysis and Design Using MATLAB, 3rd Edition, 2020, 35 Pages.

* cited by examiner

MONOSTATIC RADAR WITH PROGRESSIVE LENGTH TRANSMISSION

RELATED APPLICATIONS

This application claims the benefit of U.S. Provisional Application No. 63/046,895, filed Jul. 1, 2020, entitled "MONOSTATIC RADAR WITH PROGRESSIVE LENGTH TRANSMISSION", which is assigned to the assignee hereof, and incorporated herein in its entirety by reference.

TECHNICAL FIELD

The present disclosure relates generally to the field of wireless communications, and more specifically to using radar with progressive length signals to identify locations of objects for half-duplex devices.

BACKGROUND

Radar may be used to determine positions of objects and movement of the objects. Conventional monostatic radar operating with frequency modulated continuous waveform requires full-duplex systems (i.e., both parties can transmit and receive at the same time). In full-duplex systems, self-interference may be an issue.

BRIEF SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for radar detection of objects. A device may transmit a first signal for a first duration and receive a first reflection of the first signal from a first object during a second duration following the first duration. The device may transmit a second signal for a third duration longer than the first duration following the second duration and receive a second reflection of the second signal from a second object during a fourth duration following the third duration. The device may calculate positions of the first object and the second object based on the first reflection and the second reflection. Other embodiments of this aspect include corresponding computer systems, apparatus, and computer programs recorded on one or more computer storage devices, each configured to perform the actions of the methods.

Implementations may include one or more of the following features. In some embodiments, the first object is within a first distance from the device and the second object is between the first distance and a second distance from the device, the second distance being larger than the first distance. In some embodiments, the first duration is determined based on a minimum distance from the device that an object is detectable. In some embodiments, the third duration is determined based on the first duration. In some embodiments, a third reflection of the second signal from the second object is not detectable. In some embodiments, the first signal is a phase modulated continuous waveform. In some embodiments, the device is a full-duplex device. In some embodiments, the device is a half-duplex device. In some embodiments, the device includes a monostatic radar. Implementations of the described techniques may include hardware, a method or process, or computer software on a computer-accessible medium.

An example method for radar detection of objects, according to this disclosure, comprises transmitting, by a device, a first signal for a first duration. The method also comprises receiving, by the device, a first reflection of the first signal from a first object during a second duration following the first duration. The method also comprises transmitting, by the device, a second signal for a third duration, wherein the third duration is longer than the first duration and follows the second duration. The method also comprises receiving, by the device, a second reflection of the second signal from a second object during a fourth duration following the third duration. The method also comprises determining, by the device, positions of the first object and the second object based on the first reflection and the second reflection.

An example device for radar detection of objects, according to this disclosure, comprises a transceiver, a memory, one or more processors communicatively coupled with the transceiver and the memory, wherein the one or more processors are configured to transmit, via the transceiver, a first signal for a first duration. The one or more processing units are further configured to receive, via the transceiver, a first reflection of the first signal from a first object during a second duration following the first duration. The one or more processing units are further configured to transmit, via the transceiver, a second signal for a third duration, wherein the third duration is longer than the first duration and follows the second duration. The one or more processing units are further configured to receive, via the transceiver, a second reflection of the second signal from a second object during a fourth duration following the third duration. The one or more processing units are further configured to determine positions of the first object and the second object based on the first reflection and the second reflection.

An example apparatus for radar detection of objects, according to this disclosure, comprises means for transmitting a first signal for a first duration. The apparatus further comprises means for receiving a first reflection of the first signal from a first object during a second duration following the first duration. The apparatus further comprises means for transmitting a second signal for a third duration, wherein the third duration is longer than the first duration and follows the second duration. The apparatus further comprises means for receiving a second reflection of the second signal from a second object during a fourth duration following the third duration. The apparatus further comprises means for determining positions of the first object and the second object based on the first reflection and the second reflection.

According to this disclosure, an example non-transitory computer-readable medium stores instructions for radar detection of objects, the instructions comprising code for transmitting, from a device, a first signal for a first duration. The instructions further comprise code for receiving a first reflection of the first signal from a first object during a second duration following the first duration. The instructions further comprise code for transmitting a second signal for a third duration, wherein the third duration is longer than the first duration and follows the second duration. The instructions further comprise code for receiving a second reflection of the second signal from a second object during a fourth duration following the third duration. The instructions further comprise code for determining positions of the first object and the second object based on the first reflection and the second reflection.

Figure 1:
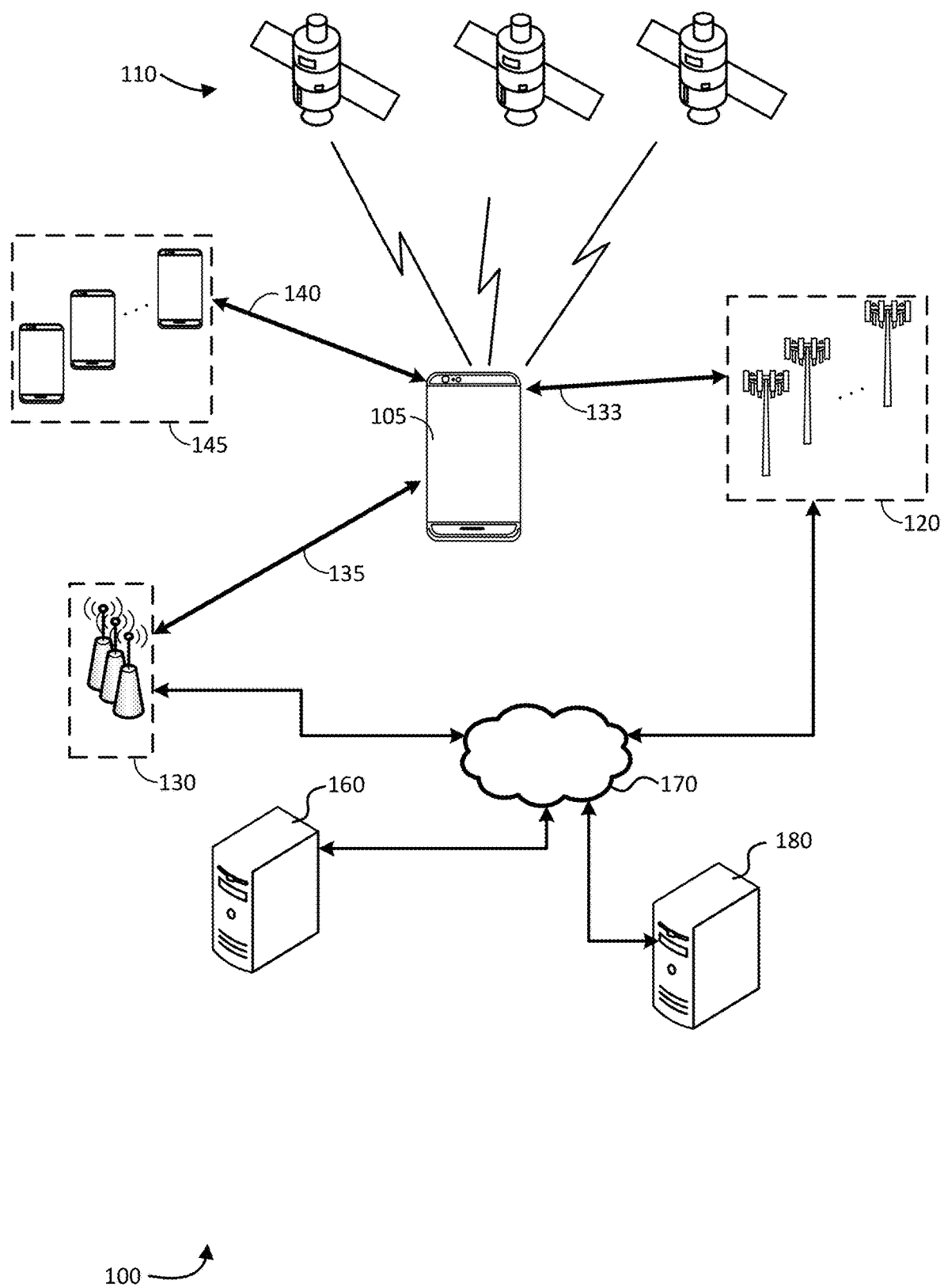
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure.

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 is a simplified illustration of a positioning system 100 in which a UE 105, location server 160, and/or other components of the positioning system 100 can use the techniques provided herein for implementing monostatic radar with progressive length transmission, according to an embodiment. The techniques described herein may be implemented by one or more components of the positioning system 100. The positioning system 100 can include: a UE 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the UE 105 based on RF signals received by and/or sent from the UE 105 and known locations of other components (e.g., GNSS satellites 110, base stations 120, APs 130) transmitting and/or receiving the RF signals. Additional details regarding particular location estimation techniques are discussed in more detail with regard to FIG. 2.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network.

The base stations 120 and access points (APs) 130 are communicatively coupled to the network 170. In some embodiments, the base station 120*s* may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as location server 160, by accessing the network 170 via a base station 120 using a first communication link 133. Additionally or alternatively, because APs 130 also may be communicatively coupled with the network 170, UE 105 may communicate with network-connected and Internet-connected devices, including location server 160, using a second communication link 135.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

The location server 160 may comprise a server and/or other computing device configured to determine an estimated location of UE 105 and/or provide data (e.g., "assistance data") to UE 105 to facilitate location measurement and/or location determination by UE 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of UE 105 using a control plane (CP) location solution for LTE radio access by UE 105. The location server 160 may further comprise a Location Management Function (LMF) that supports location of UE 105 using a control plane (CP) location solution for NR or LTE radio access by UE 105.

In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between location server 160 and UE 105 as data (e.g. data transported using the Internet Protocol (IP) and/or Transmission Control Protocol (TCP)) from the perspective of network 170.

As previously noted (and discussed in more detail below), the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

An estimated location of UE 105 can be used in a variety of applications—e.g. to assist direction finding or navigation for a user of UE 105 or to assist another user (e.g. associated with external client 180) to locate UE 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of UE 105 may comprise an absolute location of UE 105 (e.g. a latitude and longitude and possibly altitude) or a relative location of UE 105 (e.g. a location expressed as distances north or south, east or west and possibly above or below some other known fixed location or some other location such as a location for UE 105 at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which UE 105 is expected to be located with some level of confidence (e.g. 95% confidence).

The external client 180 may be a web server or remote application that may have some association with UE 105 (e.g. may be accessed by a user of UE 105) or may be a server, application, or computer system providing a location service to some other user or users which may include obtaining and providing the location of UE 105 (e.g. to enable a service such as friend or relative finder, or child or pet location). Additionally or alternatively, the external client 180 may obtain and provide the location of UE 105 to an emergency services provider, government agency, etc.

Figure 2:
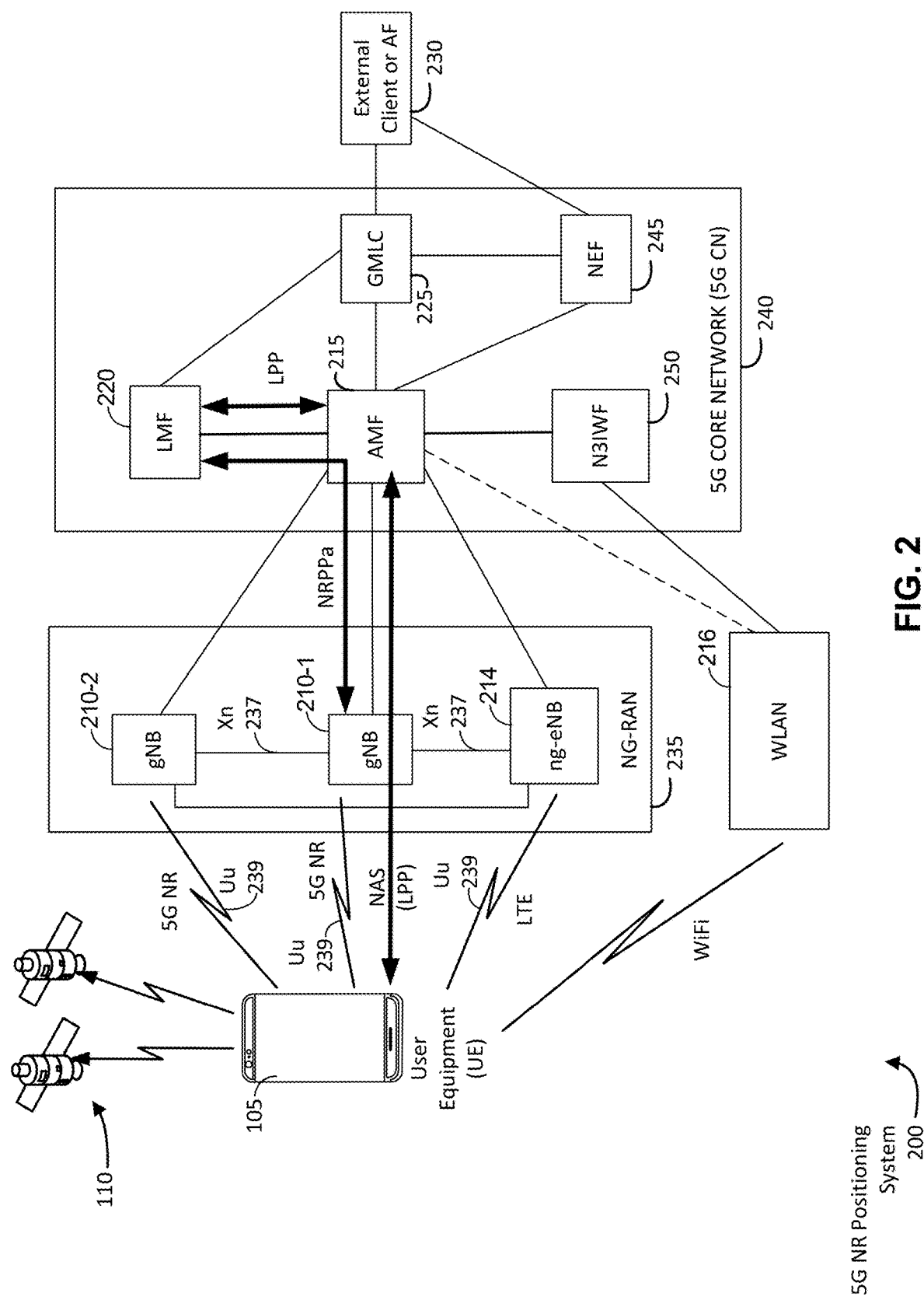
FIG. 2 a diagram of a 5th Generation (5G) New Radio (NR) positioning system, illustrating an embodiment of a positioning system (e.g., the positioning system of FIG. 1) implemented within a 5G NR communication system.

As previously noted, the example positioning system 100 can be implemented using a wireless communication network, such as an LTE-based or 5G NR-based network. FIG. 2 shows a diagram of a 5G NR positioning system 200, illustrating an embodiment of a positioning system (e.g., positioning system 100) implementing 5G NR. The 5G NR positioning system 200 may be configured to determine the location of a UE 105 by using access nodes 210, 214, 216 (which may correspond with base stations 120 and access points 130 of FIG. 1) and (optionally) an LMF 220 (which may correspond with location server 160) to implement one or more positioning methods. Here, the 5G NR positioning system 200 comprises a UE 105, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network. The 5G NR positioning system 200 may further utilize information from GNSS satellites 110 from a GNSS system like Global Positioning System (GPS) or similar system (e.g. GLONASS, Galileo, Beidou, Indian Regional Navigational Satellite System (IRNSS)). Additional components of the 5G NR positioning system 200 are described below. The 5G NR positioning system 200 may include additional or alternative components.

It should be noted that FIG. 2 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 110, gNBs 210, ng-eNBs 214, Wireless Local Area Networks (WLANs) 216, Access and mobility Management Functions (AMF) s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 105 may correspond to a cellphone, smartphone, laptop, tablet, personal data assistant (PDA), navigation device, Internet of Things (IoT) device, or some other portable or moveable device. Typically, though not necessarily, the UE 105 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 105 may also support wireless communication using a WLAN 216 which (like the one or more RATs, and as previously noted with respect to FIG. 1) may connect to other networks, such as the Internet. The use of one or more of these RATs may allow the UE 105 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 105 (e.g., via the GMLC 225). The external client 230 of FIG. 2 may correspond to external client 180 of FIG. 1, as implemented in or communicatively coupled with a 5G NR network.

The UE 105 may include a single entity or may include multiple entities, such as in a personal area network where a user may employ audio, video and/or data I/O devices, and/or body sensors and a separate wireline or wireless modem. An estimate of a location of the UE 105 may be referred to as a location, location estimate, location fix, fix, position, position estimate, or position fix, and may be geodetic, thus providing location coordinates for the UE 105 (e.g., latitude and longitude), which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.). A location of the UE 105 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations 120 in FIG. 1 and may include NR NodeB (gNB) 210-1 and 210-2 (collectively and generically referred to herein as gNBs 210). Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the 5G network is provided to UE 105 via wireless communication between the UE 105 and one or more of the gNBs 210, which may provide wireless communications access to the 5G CN 240 on behalf of the UE 105 using 5G NR. The wireless interface between base stations (gNBs 210 and/or ng-eNB 214) and the UE 105 may be referred to as a Uu interface 239. 5G NR radio access may also be referred to as NR radio access or as 5G radio access. In FIG. 2, the serving gNB for UE 105 is assumed to be gNB 210-1, although other gNBs (e.g. gNB 210-2) may act as a serving gNB if UE 105 moves to another location or may act as a secondary gNB to provide additional throughput and bandwidth to UE 105.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 105. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 105 but may not receive signals from UE 105 or from other UEs. It is noted that while only one ng-eNB 214 is shown in FIG. 2, some embodiments may include multiple ng-eNBs 214. Base stations 210, 214 may communicate directly with one another via an Xn communication interface. Additionally or alternatively, base stations 210, 214 may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 105 and may comprise one or more Wi-Fi APs (e.g., APs 130 of FIG. 1). Here, the N3IWF 250 may connect to other elements in the 5G CN 240 such as AMF 215. In some embodiments, WLAN 216 may support another RAT such as Bluetooth. The N3IWF 250 may provide support for secure access by UE 105 to other elements in 5G CN 240 and/or may support interworking of one or more protocols used by WLAN 216 and UE 105 to one or more protocols used by other elements of 5G CN 240 such as AMF 215. For example, N3IWF 250 may support IPSec tunnel establishment with UE 105, termination of IKEv2/IPSec protocols with UE 105, termination of N2 and N3 interfaces to 5G CN 240 for control plane and user plane, respectively, relaying of uplink (UL) and downlink (DL) control plane Non-Access Stratum (NAS) signaling between UE 105 and AMF 215 across an N1 interface. In some other embodiments, WLAN 216 may connect directly to elements in 5G CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 105 and the AMF 215. This can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, or WLAN 216 (alone or in combination with other components of the 5G NR positioning system 200), may be configured to, in response to receiving a request for location information from the LMF 220, obtain location measurements of uplink (UL) signals received from the UE 105) and/or obtain downlink (DL) location measurements from the UE 105 that were obtained by UE 105 for DL signals received by UE 105 from one or more access nodes. As noted, while FIG. 2 depicts access nodes 210, 214, and 216 configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 105, a RAN may comprise an E-UTRAN, which may comprise base stations comprising eNBs supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 105 may be applicable to such other networks.

The gNBs 210 and ng-eNB 214 can communicate with an AMF 215, which, for positioning functionality, communicates with an LMF 220. The AMF 215 may support mobility of the UE 105, including cell change and handover of UE 105 from an access node 210, 214, or 216 of a first RAT to an access node 210, 214, or 216 of a second RAT. The AMF 215 may also participate in supporting a signaling connection to the UE 105 and possibly data and voice bearers for the UE 105. The LMF 220 may support positioning of the UE 105 using a CP location solution when UE 105 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 105, e.g., received from the AMF 215 or from the GMLC 225. The LMF 220 may be connected to AMF 215 and/or to GMLC 225. In some embodiments, a network such as 5GCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 105's location) may be performed at the UE 105 (e.g., by measuring downlink PRS (DL-PRS) signals transmitted by wireless nodes such as gNBs 210, ng-eNB 214 and/or WLAN 216, and/or using assistance data provided to the UE 105, e.g., by LMF 220).

The Gateway Mobile Location Center (GMLC) 225 may support a location request for the UE 105 received from an external client 230 and may forward such a location request to the AMF 215 for forwarding by the AMF 215 to the LMF 220. A location response from the LMF 220 (e.g., containing a location estimate for the UE 105) may be similarly returned to the GMLC 225 either directly or via the AMF 215, and the GMLC 225 may then return the location response (e.g., containing the location estimate) to the external client 230.

A Network Exposure Function (NEF) 245 may be included in 5GCN 240. The NEF 245 may support secure exposure of capabilities and events concerning 5GCN 240 and UE 105 to the external client 230, which may then be referred to as an Access Function (AF) and may enable secure provision of information from external client 230 to 5GCN 240. NEF 245 may be connected to AMF 215 and/or to GMLC 225 for the purposes of obtaining a location (e.g. a civic location) of UE 105 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.445. NRPPa messages may be transferred between a gNB 210 and the LMF 220, and/or between an ng-eNB 214 and the LMF 220, via the AMF 215. As further illustrated in FIG. 2, LMF 220 and UE 105 may communicate using an LTE Positioning Protocol (LPP) as defined in 3GPP TS 37.355. Here, LPP messages may be transferred between the UE 105 and the LMF 220 via the AMF 215 and a serving gNB 210-1 or serving ng-eNB 214 for UE 105. For example, LPP messages may be transferred between the LMF 220 and the AMF 215 using messages for service-based operations (e.g., based on the Hypertext Transfer Protocol (HTTP)) and may be transferred between the AMF 215 and the UE 105 using a 5G NAS protocol. The LPP protocol may be used to support positioning of UE 105 using UE assisted and/or UE based position methods such as A-GNSS, RTK, TDOA, multi-cell RTT, AoD, and/or ECID. The NRPPa protocol may be used to support positioning of UE 105 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 105 access to WLAN 216, LMF 220 may use NRPPa and/or LPP to obtain a location of UE 105 in a similar manner to that just described for UE 105 access to a gNB 210 or ng-eNB 214. Thus, NRPPa messages may be transferred between a WLAN 216 and the LMF 220, via the AMF 215 and N3IWF 250 to support network-based positioning of UE 105 and/or transfer of other location information from WLAN 216 to LMF 220. Alternatively, NRPPa messages may be transferred between N3IWF 250 and the LMF 220, via the AMF 215, to support network-based positioning of UE 105 based on location related information and/or location measurements known to or accessible to N3IWF 250 and transferred from N3IWF 250 to LMF 220 using NRPPa. Similarly, LPP and/or LPP messages may be transferred between the UE 105 and the LMF 220 via the AMF 215, N3IWF 250, and serving WLAN 216 for UE 105 to support UE assisted or UE based positioning of UE 105 by LMF 220.

In a 5G NR positioning system 200, positioning methods can be categorized as being "UE assisted" or "UE based." This may depend on where the request for determining the position of the UE 105 originated. If, for example, the request originated at the UE (e.g., from an application, or "app," executed by the UE), the positioning method may be categorized as being UE based. If, on the other hand, the request originates from an external client or AF 230, LMF 220, or other device or service within the 5G network, the positioning method may be categorized as being UE assisted (or "network-based").

With a UE-assisted position method, UE 105 may obtain location measurements and send the measurements to a location server (e.g., LMF 220) for computation of a location estimate for UE 105. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAOA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 105 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 110), WLAN, etc.

With a UE-based position method, UE 105 may obtain location measurements (e.g., which may be the same as or similar to location measurements for a UE assisted position method) and may further compute a location of UE 105 (e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 105, and/or may receive measurements obtained by UE 105 or by an AP in WLAN 216 in the case of N3IWF 250, and may send the measurements to a location server (e.g., LMF 220) for computation of a location estimate for UE 105.

Positioning of the UE 105 also may be categorized as UL, DL, or DL-UL based, depending on the types of signals used for positioning. If, for example, positioning is based solely on signals received at the UE 105 (e.g., from a base station or other UE), the positioning may be categorized as DL based. On the other hand, if positioning is based solely on signals transmitted by the UE 105 (which may be received by a base station or other UE, for example), the positioning may be categorized as UL based. Positioning that is DL-UL based includes positioning, such as RTT-based positioning, that is based on signals that are both transmitted and received by the UE 105. Sidelink (SL)-assisted positioning comprises signals communicated between the UE 105 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

As noted, systems such as those depicted in FIGS. 1 and 2 may be capable of employing the techniques for monostatic radar described in more detail below. As noted, traditional monostatic radar (e.g., utilizing frequency modulated continuous waveform (FMCW) radar may require full duplex operation, which can result in self-interference (e.g., the transmitted signal interfering with a received signal) due to the length of the transmitted signal. Embodiments address these and other issues by implementing a variable or progressive signal scheme that can be used in half-duplex and full-duplex implementations, which are described in further detail hereafter with regard to FIGS. 3-8.

Figure 3:
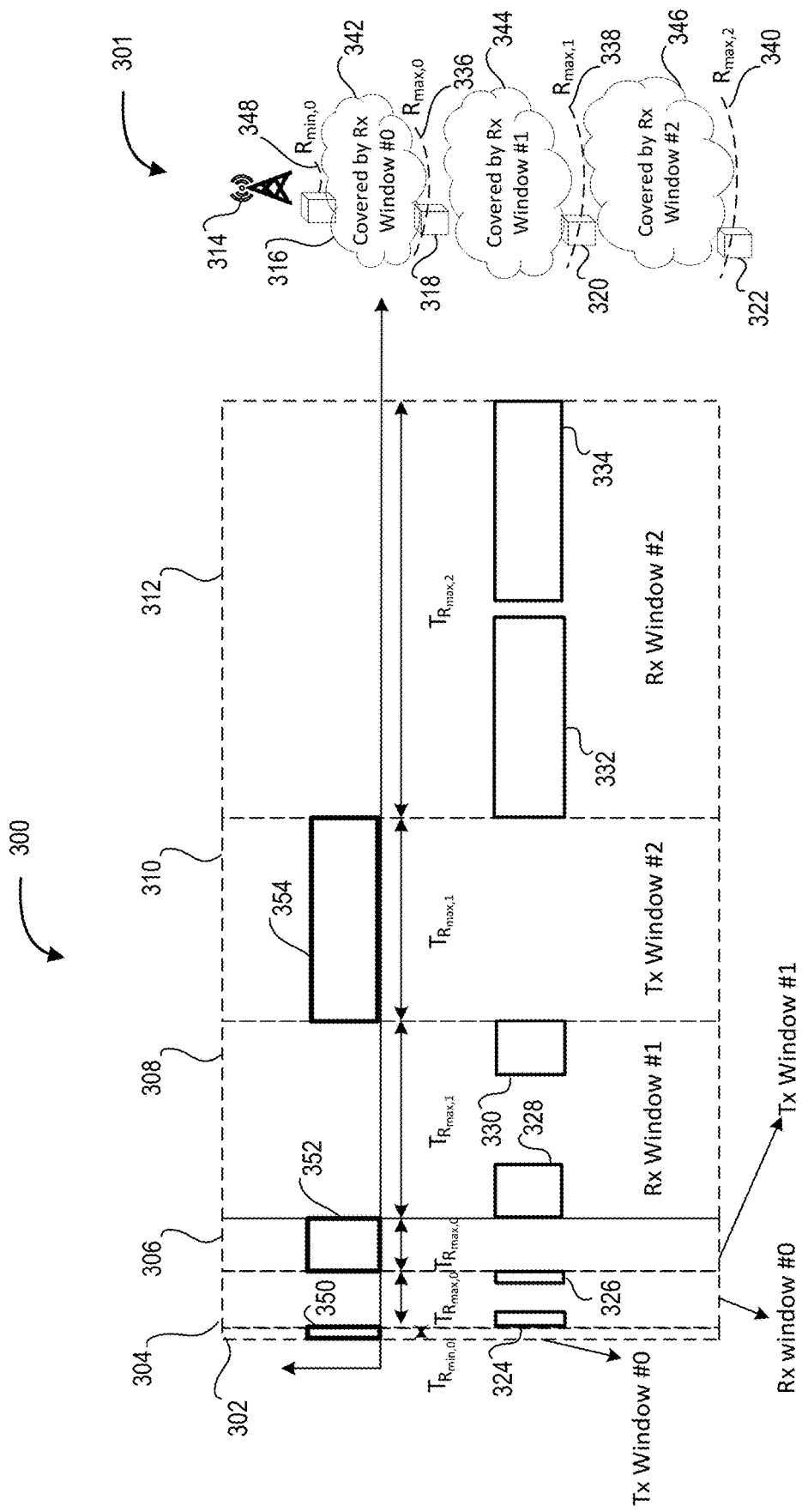
FIGS. 3-5 are graphs depicting progressive signal examples for using monostatic radar with half duplex devices, according to some embodiments.

FIG. 3 is an illustration depicting a progressive signal example for using monostatic radar with half duplex devices, according to an embodiment. Temporal representations of transmission and reception windows are represented in the graph 300, and corresponding spatial representations of corresponding ranges scanned are represented in the graph 301. Transmission signals may be sent and received by a device having a monostatic radar (i.e., the transmission and receiving antenna are the same antenna and/or collocated). A half-duplex device may send and receive signals, but the transmission and reception of signals may not overlap. A full-duplex device may send and receive signals with transmission and reception overlapping. The methods and graphs provided here may be generated using either half- or full-duplex devices, which may comprises wireless devices of the systems illustrated in FIGS. 1 and 2, for example, such as a UE 105, base station 120, access point 130, gNB 210, ng-eNB 214, etc. The functionality discussed herein of using monostatic radar with progressive pulse lengths for half-duplex devices can be regarded as consumer-level radar with advanced detection capabilities. In half-duplex devices, the functionality is possible based on the progressive length pulses detecting objects in differing ranges from the transmission device such that the transmission windows of the progressive pulses and the reception windows of the respective pulses and reflections are discrete, meaning the antenna does not transmit and receive at the same time, allowing for such capability in half-duplex devices. In full-duplex devices, the same technology may be used, which improves self-interference issues because during transmission, the receiving processor does not try to detect targets with ranges outside the transmission range. Accordingly, self-interference is reduced because previous transmissions, which are outside the transmission range of the current transmission due in part to the progressive length of the transmissions, are not detected by the receiving processor. In some embodiments, mmWave RF signals (e.g., 3GPP NR, also known as 5G, FR2/FR2x/FR4) may be reused for this purpose. Example uses for this sensing technology include health monitoring (e.g., heartbeat detection, respiration rate monitoring, and the like), gesture recognition (e.g., human activity recognition, keystroke detection, sign language recognition, and the like), contextual information acquisition (e.g., location detection and tracking, direction finding, range estimation, and the like), and automotive radar (e.g., smart cruise control, collision avoidance, and the like), and so forth.

In traditional pulsing radar systems, the pulses are repeated, but are not progressive in length. Therefore, the range of detection is static from the transmission device, and the maximum supportable range is limited by the signal to noise ratio of the single transmission signal. And as previously noted, for FMCW radar, full-duplex systems may be required.

The functionality described in FIG. 3 and throughout provides a solution for the above discussed shortcomings. FIG. 3 is an illustration of one embodiment depicting three transmission and reception windows. In some embodiments, more or fewer than three transmission and reception windows may be used. The device 314 is configured to calculate a first transmission window 302, a first reception window 304, a second transmission window 306, a second reception window 308, a third transmission window 310, and a third reception window 312. The device 314 uses the signals 350, 352, and 354 to detect object 316, object 318, object 320, and object 322, respectively. The objects 316, 318, 320, and 322 are differing distances from the device 314. The first transmission window 302 (Tx Window #0) and first reception window 304 (Rx Window #0) are configured to identify objects that are within a first distance 336 ($R_{max,0}$) of device 314, but not closer than the minimum distance 348 ($R_{min,0}$). The device transmits the first signal 350 during the first transmission window 302 and listens for reflections of the first signal 350 during the first reception window 304. According to some embodiments, the minimum distance 348 may be a design parameter of device 314. Accordingly, objects within range 342 can be detected during the first reception window 304. Objects that are further away from the device may not be detected because the reflections of the signals may be too weak or may not come back during a reception window.

The second transmission window 306 (Tx Window #1) and the second reception window 308 (Rx Window #1) are configured to identify objects that are between a second distance 338 ($R_{max,1}$) and the first distance 336 ($R_{max,0}$). The device transmits the second signal 352 during the second transmission window 306 and listens for reflections of the second signal 352 during the second reception window 308. Accordingly, objects within range 344 can be detected during the second reception window 308. Reflections of the second signal 352 during the second transmission window 306 of objects that are outside the second range 344 may not be detected because the signal will not be strong enough and/or may be received at least partially outside the second reception window 308.

The third transmission window 310 (Tx Window #2) and the third reception window 312 (Rx Window #2) are configured to identify objects that are between the maximum distance 340 ($R_{max,2}$) and the second distance 338 ($R_{max,1}$). The device transmits the third signal 354 during the third transmission window 310 and listens for reflections of the third signal 354 during the third reception window 312. Accordingly, objects within range 346 can be detected during the third reception window 312. Reflections of the third signal 354 during the third transmission window 310 of objects that are outside the third range 346 may not be detected because the signal may be too weak and/or be received at least partially outside the third reception window 312.

In this example, objects are detected from reflections received during the various reception windows. As shown during the first reception window 304, the first reflection 324 of the first object 316 is detected and the second reflection 326 of the second object 318 is detected. While reflections of the third object 320 and the fourth object 322 may return, they will not return within the first reception window 304. As shown during the second reception window 308, the third reflection 328 of the second object 318 is detected and the fourth reflection 330 of the third object 320 is detected. The second object 318 is therefore detected during the first reception window 304 and during the second reception window 308. As shown during the third reception window 312, the fifth reflection 332 of the third object 320 is detected and the six reflection 334 of the fourth object 322 is detected. The third object 320 is therefore detected during the second reception window 308 and during the third reception window 312.

While three transmission windows and shown, any number of progressive length transmission windows and corresponding reception windows can be used to identify objects based on the signal reflecting from the object. The transmission and reception windows may be limited by the minimum distance 348 and the maximum distance 340. Accordingly, any number of transmission windows may be determined to cover the range between the minimum distance 348 and the maximum distance 340. The progressive signals (e.g., the first signal 350, second signal 352, and third signal 354) may be sent repeatedly. For example, once the pattern of transmitting and receiving in the first, second, and third transmission and reception windows are completed, it may be repeated any number of times to continuously monitor the area around the device.

Figure 4:
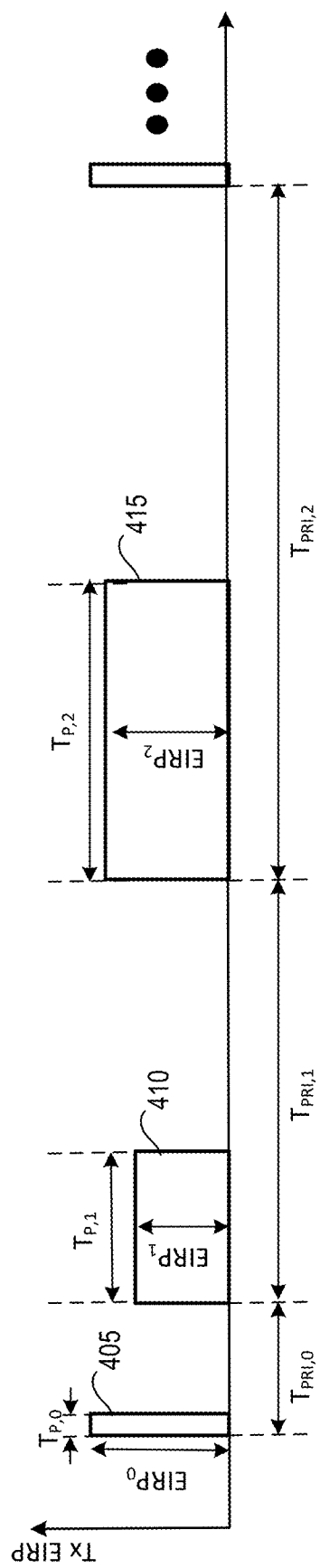

FIG. 4 is an illustration depicting a progressive signal example for using monostatic radar with half duplex devices. The first signal 405 may correspond to the first signal 350 of FIG. 3. The first signal 405 has a duration of $T_{p,0}$ and an effective isotropically radiated power (EIRP) of $EIRP_0$. $EIRP_0$ can be determined based on the power $P_{Tx,0}$ of the transmit antenna multiplied by the gain $G_{Tx,0}$ of the transmit antenna. The duration of the first signal 405 may be determined based on the minimum range of detecting an object $R_{min,req}$, which may be a design parameter of the transmit antenna, as indicated by the following equation:

$$T_{P,0} = \frac{2R_{min,req}}{C}. \tag{1}$$

The first pulse interval, $T_{PRI,0}$, can be calculated using the maximum range based on signal to noise ratio ($R_{max,SNR}$) of the first signal 405 plus the first duration $T_{p,0}$ as indicated by the following equation:

$$T_{PRI,0} = 2R_{max,SNR}(P_{TX,0}G_{TX,0}T_{P,0})/c + T_{P,0}. \tag{2}$$

During the first pulse interval $T_{PRI,0}$, the first signal 405 may be transmitted, during which time the antenna may not receive signals and may only transmit. At the end of the first signal 405, and for the remainder of the first pulse interval $T_{PRI,0}$, the antenna may receive reflections of the first signal 405 from objects within the first range (e.g., range 342 as described with respect to FIG. 3) between the minimum range of detecting an object $R_{min,req}$ and the maximum range based on signal to noise ratio ($R_{max,SNR}$) of the first signal 405.

According to this example, immediately following the first pulse interval $T_{PRI,0}$, the second pulse interval $T_{PRI,1}$ begins with transmission of the second signal 410. The second signal 410 may correspond to the second signal 352 of FIG. 3. The second signal 410 has a duration of $T_{p,1}$ and an EIRP of $EIRP_1$. $EIRP_1$ can be determined based on the power $P_{Tx,1}$ of the transmit antenna multiplied by the $Gain_{Tx,1}$ of the transmit antenna during the transmission of the second signal 410. The duration of the second signal 410 may be determined based on the maximum range based on the signal to noise ratio of the first signal 405, $R_{max,SNR}$ as follows:

$$T_{P,1} = 2R_{max,SNR}(P_{TX,0}G_{TX,0}T_{P,0})/c. \tag{3}$$

In other words, the second signal 410 may be determined based on a range that corresponds to the far distance covered by the first signal 405. The second pulse interval $T_{PRI,1}$, may be calculated using the maximum range based on signal to noise ratio of the second signal 410 as follows:

$$T_{PRI,1} = 2R_{max,SNR}(P_{TX,1}G_{TX,1}T_{P,1})/c + T_{P,1}. \tag{4}$$

During the second pulse interval $T_{PRI,1}$ the second signal 410 may be transmitted, during which time the antenna may not receive signals and only transmits. At the end of the second signal 410 for the remainder of the second pulse interval $T_{PRI,1}$, the antenna may receive reflections of the second signal 410 from objects within the second range (e.g., range 344 as described with respect to FIG. 3) between the maximum range based on signal to noise ratio ($R_{max,SNR}$) of the first signal 405 and the maximum range based on signal to noise ratio ($R_{max,SNR}$) of the second signal 410.

The example shown in FIG. 4 depicts three signals, but any number of signals may be used. Immediately following the second pulse interval $T_{PRI,1}$, the third pulse interval $T_{PRI,2}$ may begin with transmission of the third signal 415. The third signal 415 may correspond to the third signal 354 of FIG. 3. The third signal 415 has a duration of $T_{p,2}$ and an EIRP of $EIRP_2$. $EIRP_2$ can be determined based on the power $P_{Tx,2}$ of the transmit antenna multiplied by the $Gain_{Tx,2}$ of the transmit antenna during the transmission of the third signal 415. The duration of the third signal 415 may be determined based on the maximum range based on the signal to noise ratio of the second signal 410, $R_{max,SNR}$ as follows:

$$T_{P,1}=2R_{max,SNR}(P_{TX,0}G_{TX,0}T_{P,0})/c. \quad (5)$$

In other words, the third signal 415 may be determined based on a range that corresponds to the far distance covered by the second signal 410. The third pulse interval $T_{PRI,2}$, may be calculated using the maximum range based on signal to noise ratio of the third signal 415, using the following equation:

$$T_{PRI,2}=2R_{max,SNR}(P_{TX,2}G_{TX,2}T_{P,2})/c+T_{P,2}. \quad (6)$$

During the third pulse interval $T_{PRI,2}$ the third signal 415 may be transmitted, during which time the antenna does may not receive signals and may only transmit. At the end of the third signal 415 for the remainder of the third pulse interval $T_{PRI,2}$, the antenna may receive reflections of the third signal 415 from objects within the third range (e.g., range 346 as described with respect to FIG. 3) between the maximum range based on signal to noise ratio ($R_{max,SNR}$) of the second signal 410 and the maximum range based on signal to noise ratio ($R_{max,SNR}$) of the third signal 415.

In some embodiments, the first, second, and third signals may be repeatedly transmitted (e.g., repeating the pattern shown in FIG. 4 and described above) as described to continuously monitor with radar the area surrounding the device.

Figure 5:
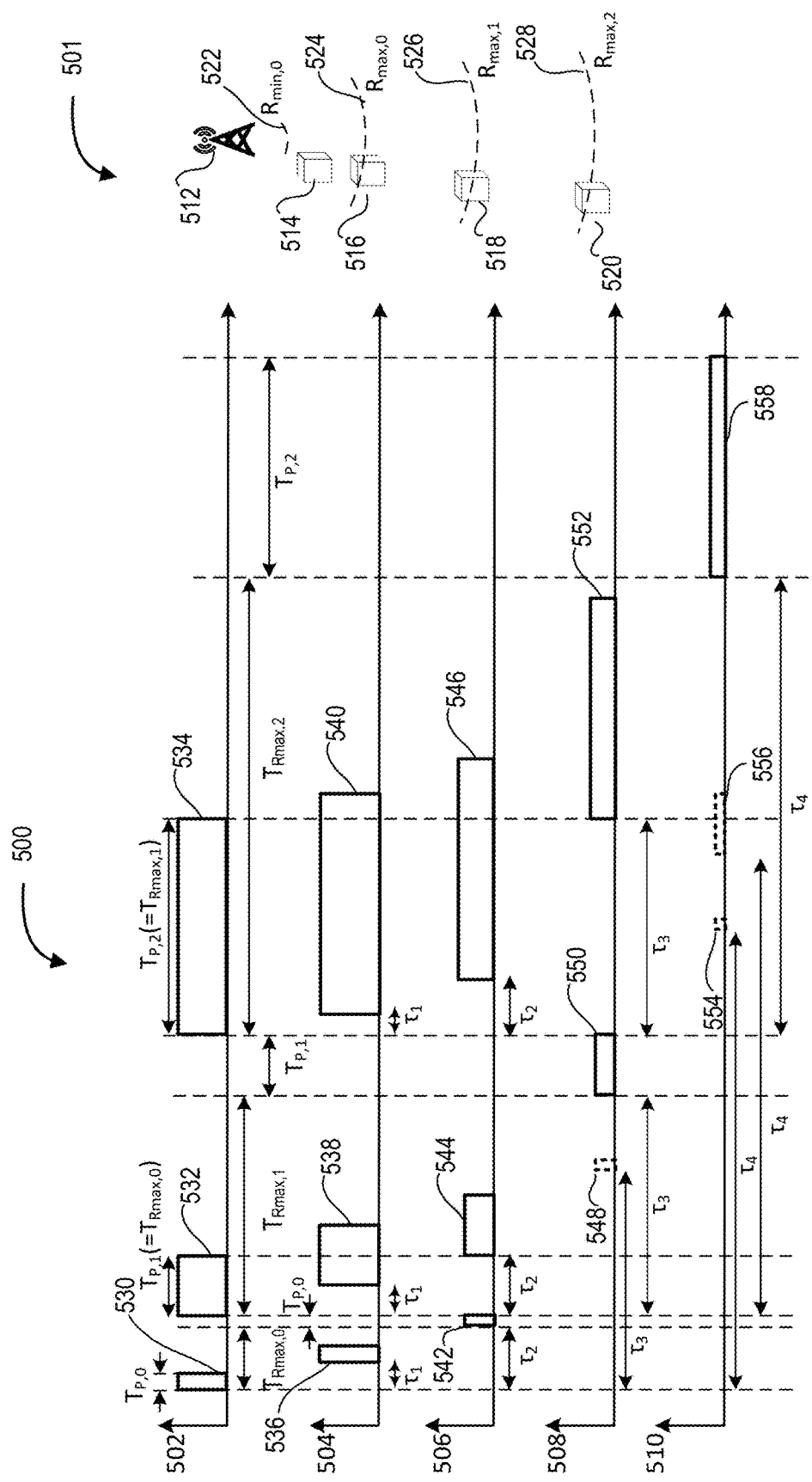

FIG. 5 is an illustration depicting a progressive signal example for using monostatic radar with half duplex devices, according to an embodiment. Similar to FIG. 3, temporal representations of transmission and reception windows are represented in the graphs 500, and corresponding spatial representations of corresponding ranges scanned are represented in the graph 501. Notation of variables in FIG. 5 reflects notation previously described with respect to FIGS. 3 and 4. In this illustration, the transmission graph 502 shows the transmission signals 530, 532, and 534, and reception graphs 504, 506, 508, and 510 show reflections of the transmission signals due to objects 514, 516, 518, and 520, respectively. With respect to the transmission graph 502, the first transmission signal 530 may correspond to the first signal 405 of FIG. 4 and/or the first signal 350 of FIG. 3. The second signal 532 may correspond to the second signal 410 of FIG. 4 and/or the second signal 352 of FIG. 3. The third signal 534 may correspond to the third signal 415 of FIG. 4 and/or the third signal 354 of FIG. 3. In this example, the signals are transmitted by device 512. The first signal 530 is sent to detect objects between the minimum range 522 and the maximum range 524 of the first signal 530. The second signal 532 is sent to detect objects between the maximum range 524 of the first signal 530 and the maximum range 526 of the second signal 532. The third signal 534 is sent to detect objects between the maximum range 526 of the second signal 532 and the maximum range 528 of the third signal 534. The first object 514 may be detected based on the first signal 530. The second object 516 may be detected based on the first signal 530 and the second signal 532 since it is right near the maximum range 524 of the first signal 530. The third object 518 may be detected based on the second signal 532 and based on the third signal 534 because it is very near the maximum range 526 of the second signal 532. The fourth object 520 may be detected based on the third signal 534.

Reception graph 504 depicts the reflections of the signals based on the first object 514. The reflection signal 536 is received based on transmission of the first signal 530 reflecting off object 514. It is received during the first reception window, after transmission of the first signal 530 and before transmission of the second signal 532. Accordingly, the device 512 receives the reflection signal 536 and can detect the first object 514. Based on the time of arrival of the reflection signal 536 and the transmission of the first signal 530 (shown in FIG. 5 as $\tau_1$), the location of or distance from the device 512 can be calculated. The second reflection signal 538 of the first object 514 is a reflection of the second signal 532 from the first object 514. The second reflection signal 538 may arrive at least partially during transmission of the second signal 532. In some embodiments, because the entire reflection signal 538 is not received during the receiving window for the second signal 532, second reflection signal 538 may be discarded. In some embodiments, the receiving processor may detect the second reflection signal 538 and, because the second reflection signal 538 is received at least partially during the transmission window for the second signal 532 and may therefore have self-interference, the receiving processor may deweight the second reflection signal 538 or, in some embodiments, may try to filter some or all of the self-interference. In some embodiments, the second reflection signal 538 may have sufficient signal to noise ratio to process the second reflection signal 538. In some embodiments, the second reflection signal 538 may be evaluated with a threshold check to determine whether the signal to noise ratio of the second reflection signal 538 exceeds a threshold and, based on the check, the receiving processor may weight, filter, discard, or process the second reflection signal 538. The third reflection signal 540 of the first object 514 is a reflection of the third signal 534 from the first object 514. Because the third reflection signal 540 partially arrives during transmission of the third signal 534, the receiving processor may detect the third reflection signal 540 and deweight, filter, process, or discard the third reflection signal 540 as was described with respect to second reflection signal 538.

Reception graph 506 depicts the reflections of the signals based on the second object 516. The reflection signal 542 is received based on transmission of the first signal 530 reflecting off object 516. It is received during the first reception window, after transmission of the first signal 530 and before transmission of the second signal 532. Accordingly, the device 512 receives the reflection signal 542 and can detect the second object 516. Based on the time of arrival of the reflection signal 542 and the transmission of the first signal 530 (shown in FIG. 5 as $\tau_2$), the location of, or distance from, the device 512 can be calculated for the second object 516. The second reflection signal 544 of the second object 516 is a reflection of the second signal 532 from the second object 516. Because this second reflection signal 544 arrives during the second reception window, after transmission of the second signal 532 and before transmission of the third signal 534, during which time the antenna of device 512 is only receiving, the second object 516 is detected based on the second signal 532. The third reflection signal 546 of the second object 516 is a reflection of the third signal 534 from the second object 516. The third reflection signal 546 may arrive at least partially during transmission of the third signal 534. In some embodiments, because the entire reflection signal 546 is not received during the receiving window for the third signal 534, third reflection signal 546 may be discarded. In some embodiments, the receiving processor may detect the third reflection signal 546 and, because the third reflection signal 546 is received at least partially during the transmission window for the third signal 534 and may therefore have self-interference, the receiving processor may deweight the third reflection signal 546 or, in some embodiments, may try to filter some or all of the self-interference. In some embodiments, the third reflection signal 546 may have sufficient signal to noise ratio to process the third reflection signal 546. In some embodiments, the third reflection signal 546 may be evaluated with a threshold check to determine whether the signal to noise ratio of the third reflection signal 546 exceeds a threshold and, based on the check, the receiving processor may weight, filter, discard, or process the third reflection signal 546.

Reception graph 508 depicts the reflections of the signals based on the third object 518. The reflection signal 548 (which takes a length of time $\tau_3$ to reflect back to the antenna after transmission) is received based on transmission of the first signal 530 reflecting off the third object 518. It is received during the second reception window, after transmission of the second signal 532 and before transmission of the third signal 534. However, the reception signal to noise ratio of the signal for this reception window may be too low to detect the third object 518 based on the first signal 530. The second reflection signal 550 of the third object 518 is a reflection of the second signal 532 from the third object 518. Because this second reflection signal 550 arrives during the second reception window, after transmission of the second signal 532 and before transmission of the third signal 534, during which time the antenna of device 512 is only receiving, the second object 518 is detected based on the second signal 532. The third reflection signal 552 of the third object 518 is a reflection of the third signal 534 from the third object 518. The third reflection signal 552 arrives during the third reception window, after transmission of the third signal 534 and before transmission of any other signals, and according the third object 518 is detected based on the third signal 534.

Reception graph 510 depicts the reflections of the signals based on the fourth object 520. The reflection signal 554 is received based on transmission of the first signal 530 reflecting off the fourth object 520 (which takes a length of time 14 to reflect back to the antenna after transmission). It is received during the transmission of the third signal 534, when the antenna of device 512 is only transmitting and not receiving, so the reflection signal 554 may not be received or if it is received the signal to noise ratio may be too low to detect the fourth object 520 based on the first signal 530. The second reflection signal 556 of the fourth object 520 is a reflection of the second signal 532 from the fourth object 520. Because this second reflection signal 556 arrives at least partially during the transmission of the third signal 534 and/or because the signal to noise ratio of the second reflection signal 556 may be too low, the fourth object 520 may not be detected based on the second signal 532. The third reflection signal 558 of the fourth object 520 is a reflection of the third signal 534 from the fourth object 520. The third reflection signal 558 arrives during the third reception window, after transmission of the third signal 534 and before transmission of any other signals, and according the fourth object 520 is detected based on the third signal 534.

Figure 6:
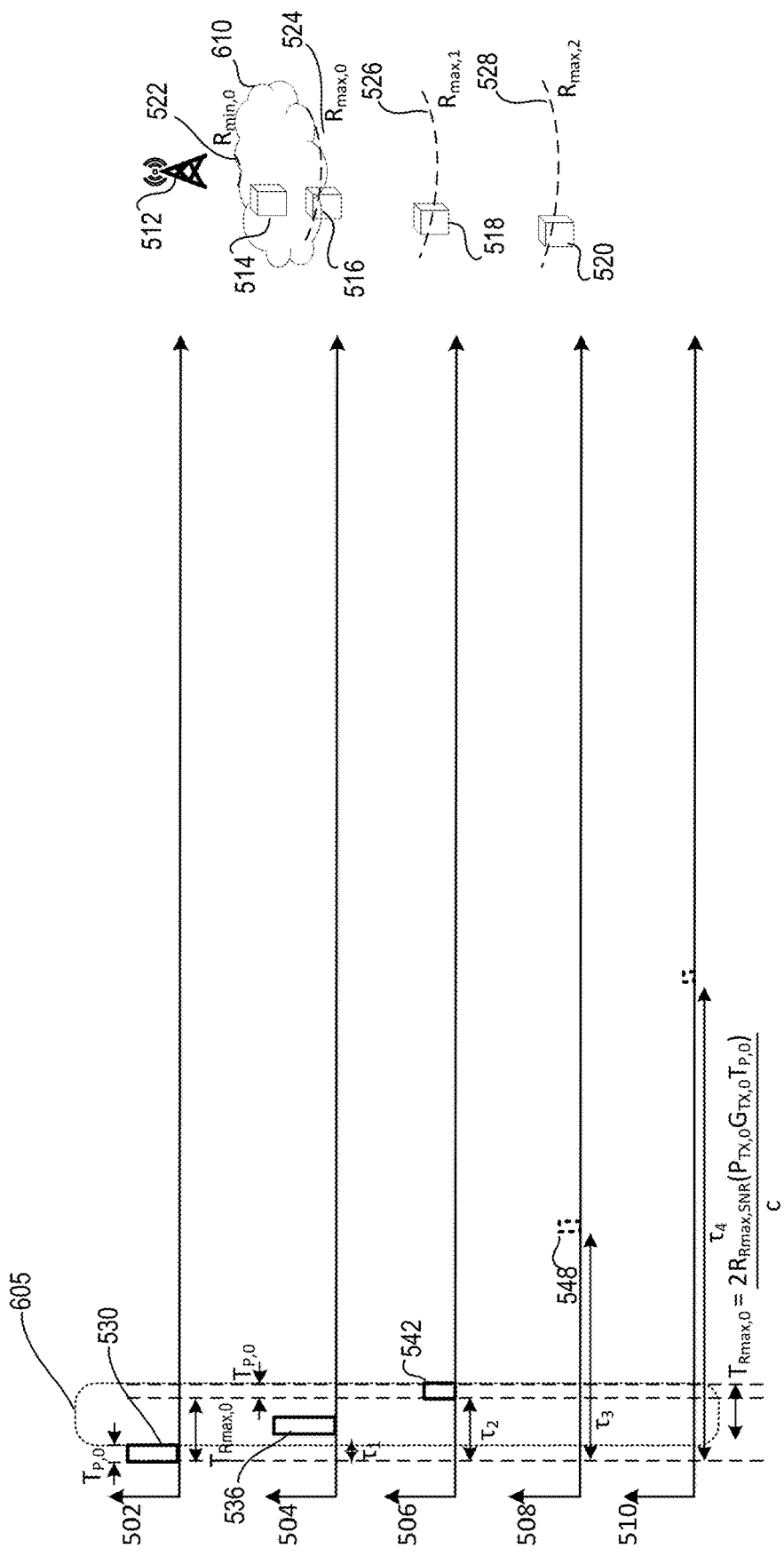
FIG. 6 is an example graph of a first transmission, according to an embodiment.

FIG. 6 is an illustration depicting a progressive signal example for using monostatic radar with half duplex devices. FIG. 6 illustrates transmission graph 502, and reception graphs 504, 506, 508, and 510 during the transmission of the first signal 530 and the first reception window 605. Transmission of the first signal 530 detects objects that are within the range 610 distance from device 512, as shown. Based on transmission of the first signal 530, the first object 514 is detected based on reflection signal 536 and the second object 516 is detected based on reflection signal 542. The third object 518 is not detected based on the first signal 530 because the reflection signal 548 is received outside the first reception window 605 and the reflection signal 548 is too weak to detect. Similarly, the fourth object 520 is not detected based on the first signal 530 because the reflection signal 554 is received outside the first reception window 605 and the reflection signal 554 is too weak to detect.

Figure 7:
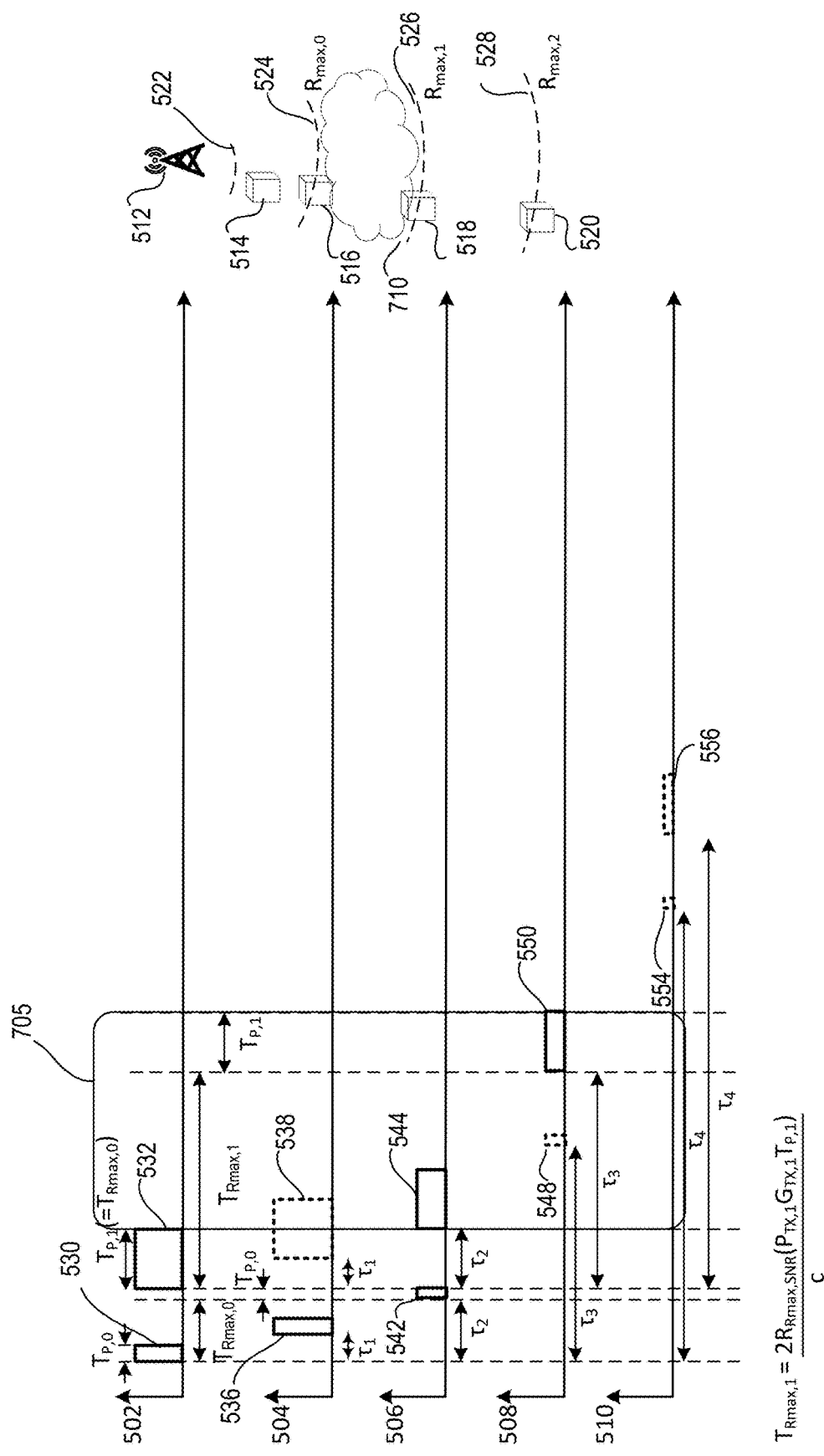
FIG. 7 is an example graph of a second transmission, according to an embodiment.

FIG. 7 is an illustration depicting a progressive signal example for using monostatic radar with half duplex devices. FIG. 7 illustrates transmission graph 502, and reception graphs 504, 506, 508, and 510 highlighting the transmission of the second signal 532 and the second reception window 705. Transmission of the second signal 532 detects objects that are within the range 710 distance from device 512, as shown. Based on transmission of the second signal 532, the first object 514 is not detected based on reflection signal 538 because it does not fully overlap the reception window 705. The second object 516 is detected based on reflection signal 544, and the third object 518 is detected based on reflection signal 550. The fourth object 520 is not detected based on the first signal 530 because the reflection signal 556 is received outside the second reception window 705 and the reflection signal 556 is too weak to detect.

Figure 8:
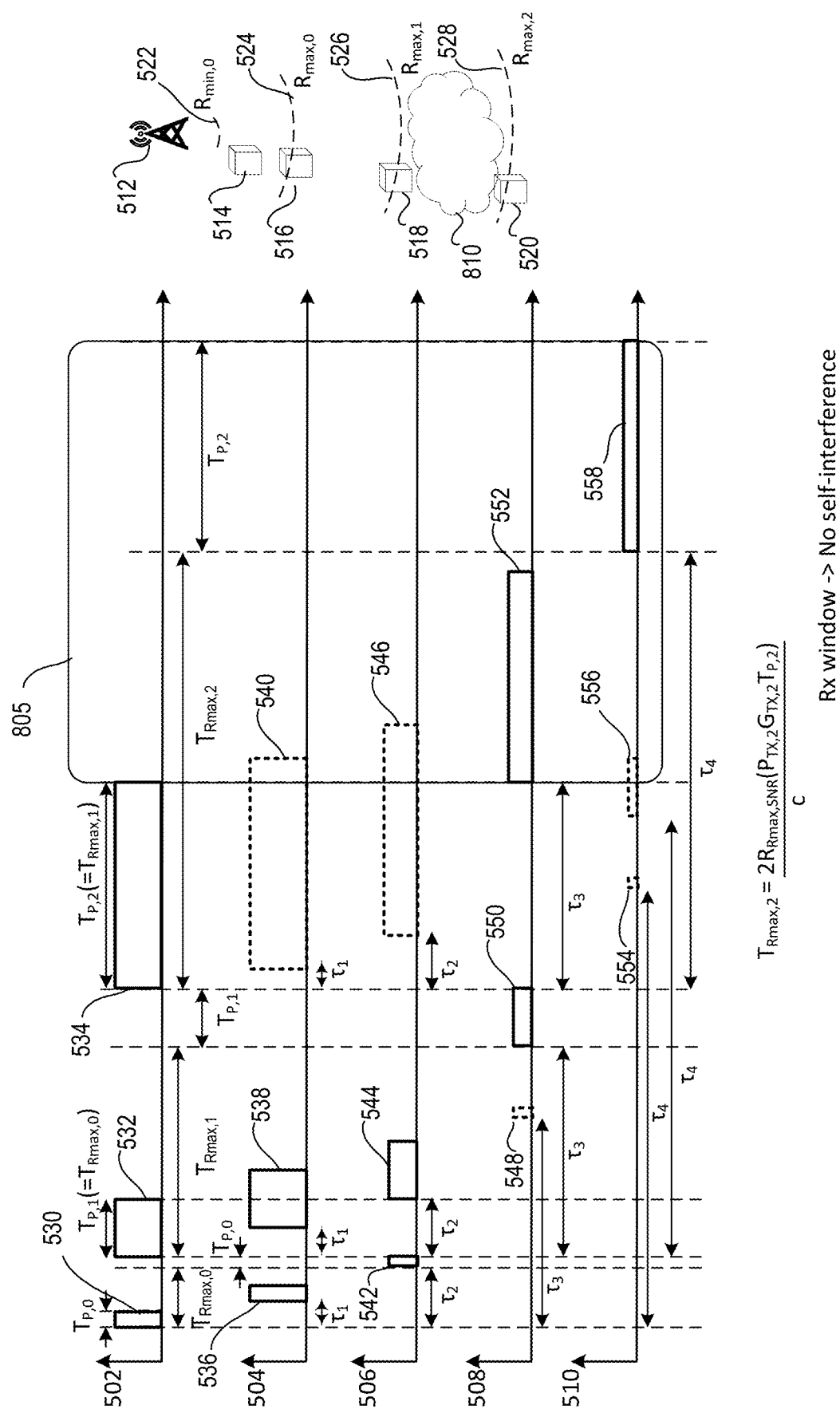
FIG. 8 is an example graph of a third transmission, according to an embodiment.

FIG. 8 is an illustration depicting a progressive signal example for using monostatic radar with half duplex devices. FIG. 8 illustrates transmission graph 502, and reception graphs 504, 506, 508, and 510 highlighting the transmission of the third signal 534 and the third reception window 805. Transmission of the third signal 534 detects objects that are within the range 810 distance from device 512, as shown. Based on transmission of the third signal 534, the first object 514 may not detected based on reflection signal 540 because it does not fully overlap the reception window 805. In some embodiments, reflection signal 540 may be discarded, deweighted, processed, or filtered. The second object 516 may not detected based on reflection signal 546 because it does not fully overlap the reception window 805. In some embodiments, reflection signal 546 may be discarded, deweighted, processed, or filtered. The third object 518 is detected based on reflection signal 552 as it is fully received within the third reception window 805, and the fourth object 520 is detected based on the third signal 534 because the reflection signal 558 is received within the third reception window 805.

Figure 9:
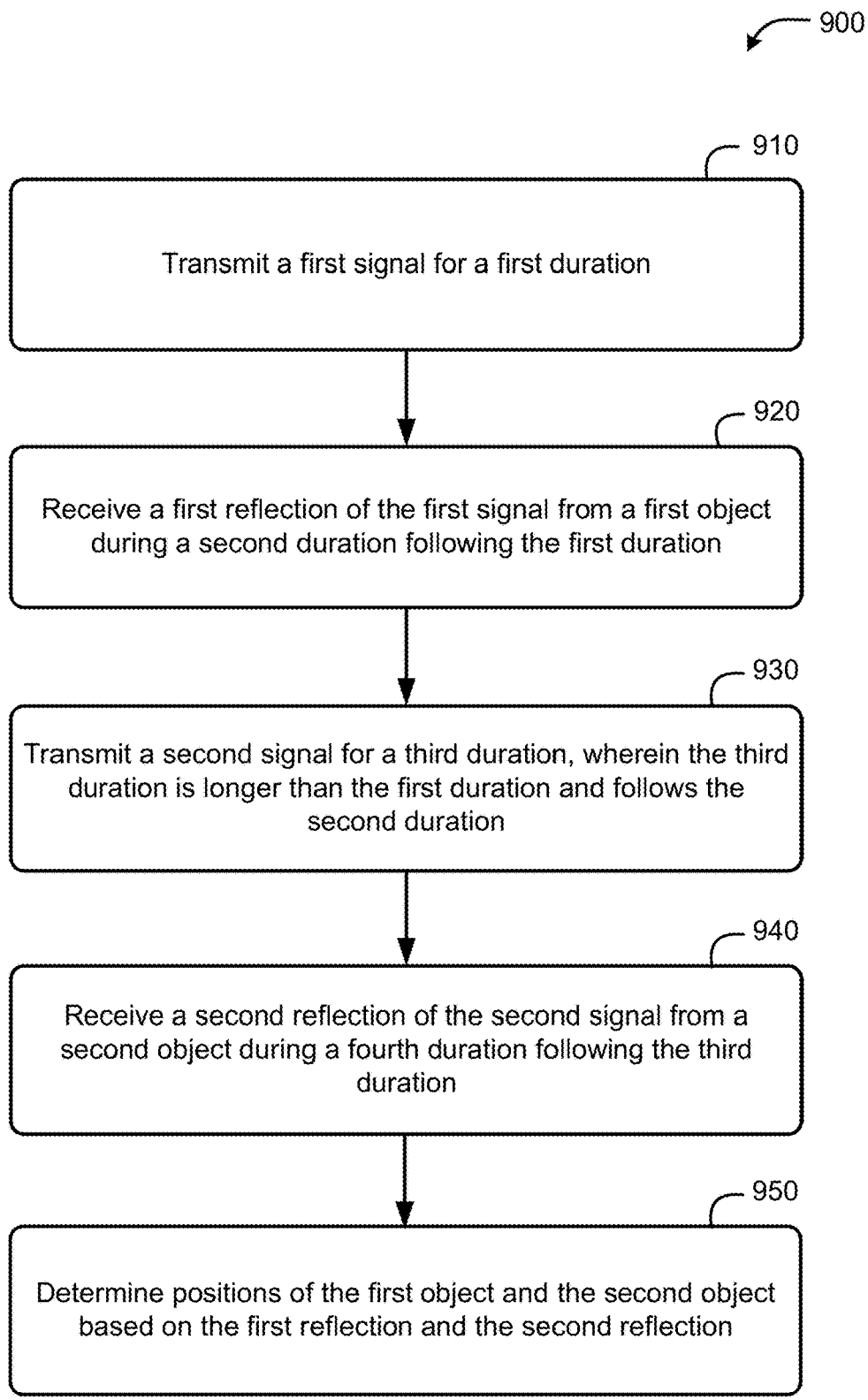
FIG. 9 is a flow diagram for using monostatic radar for half duplex systems, according to an embodiment.
Figure 10:
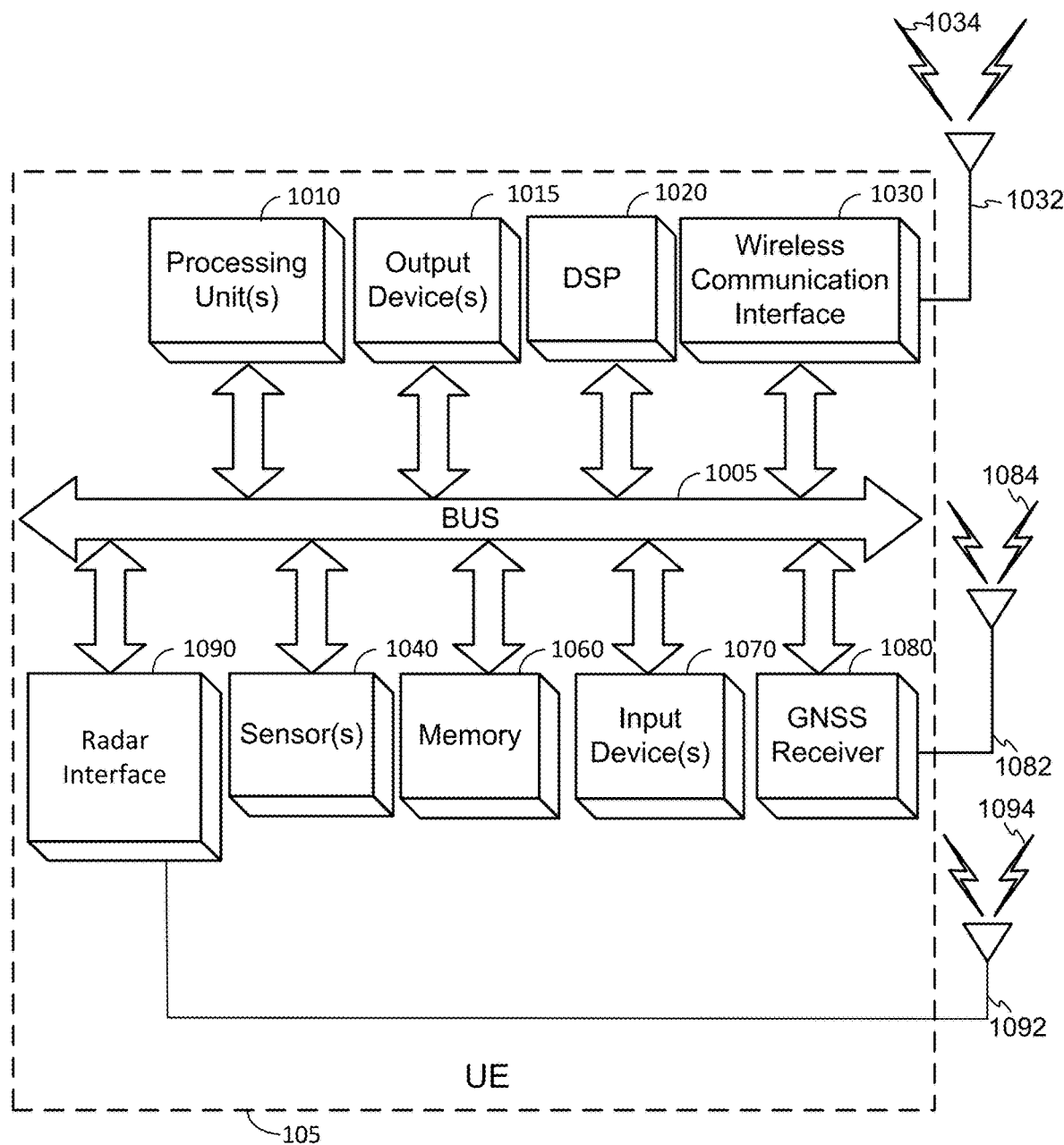
FIG. 10 is a block diagram of an embodiment of a UE, which can be utilized in embodiments as described herein.
Figure 11:
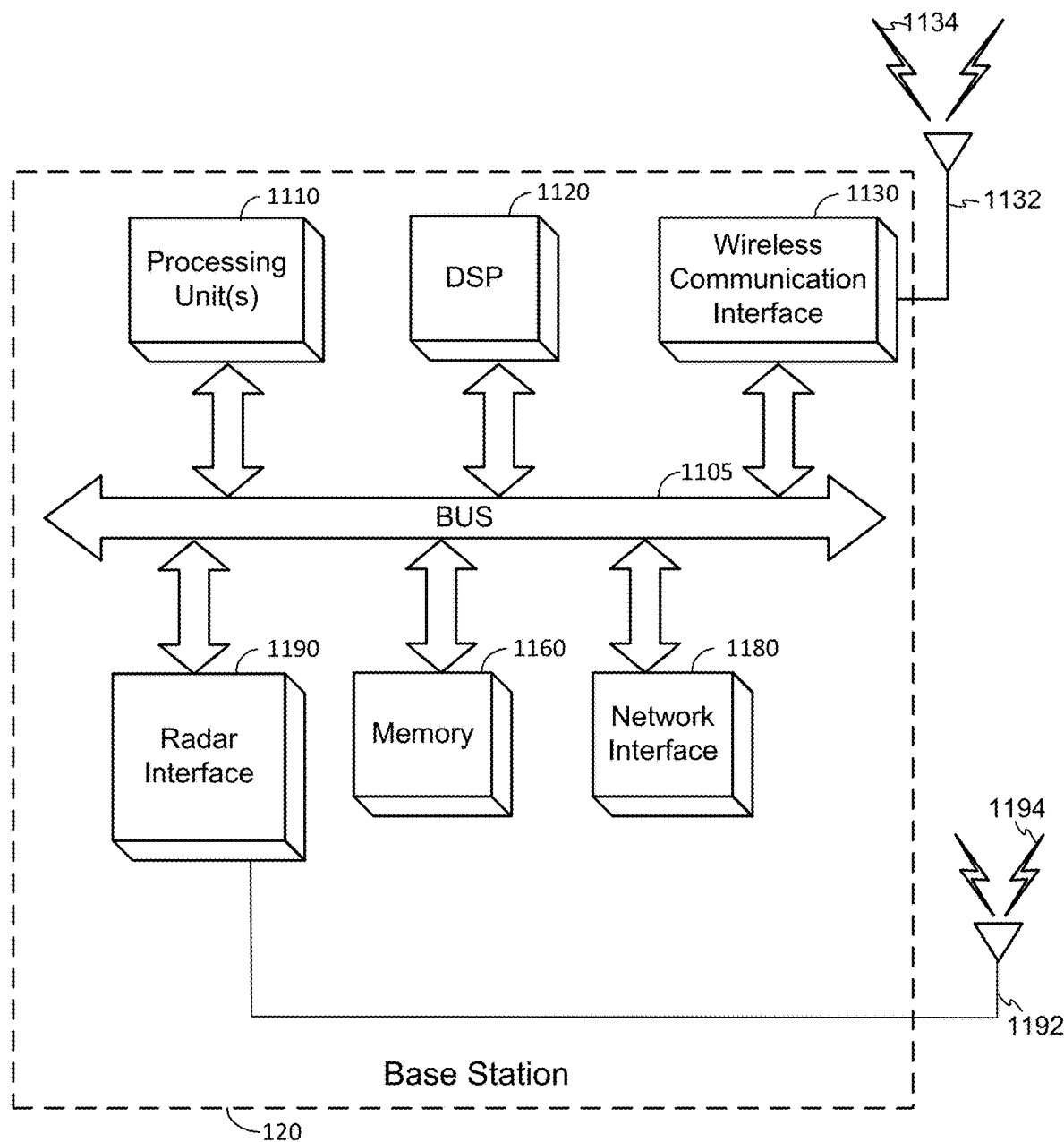
FIG. 11 is a block diagram of an embodiment of a base station, which can be utilized in embodiments as described herein.

FIG. 9 is a flow diagram of a method 900 for radar detection of objects, according to an embodiment. Means for performing the functionality illustrated in the blocks shown in FIG. 9 may be performed by hardware and/or software components of a wireless device as previously described with regard to FIGS. 1-8, such as a UE, a base station, and/or any other suitable computing device comprising a radar antenna. Example components of a UE and/or base station are illustrated in FIGS. 10, 11, and/or 12, which are described in more detail below.

Figure 12:
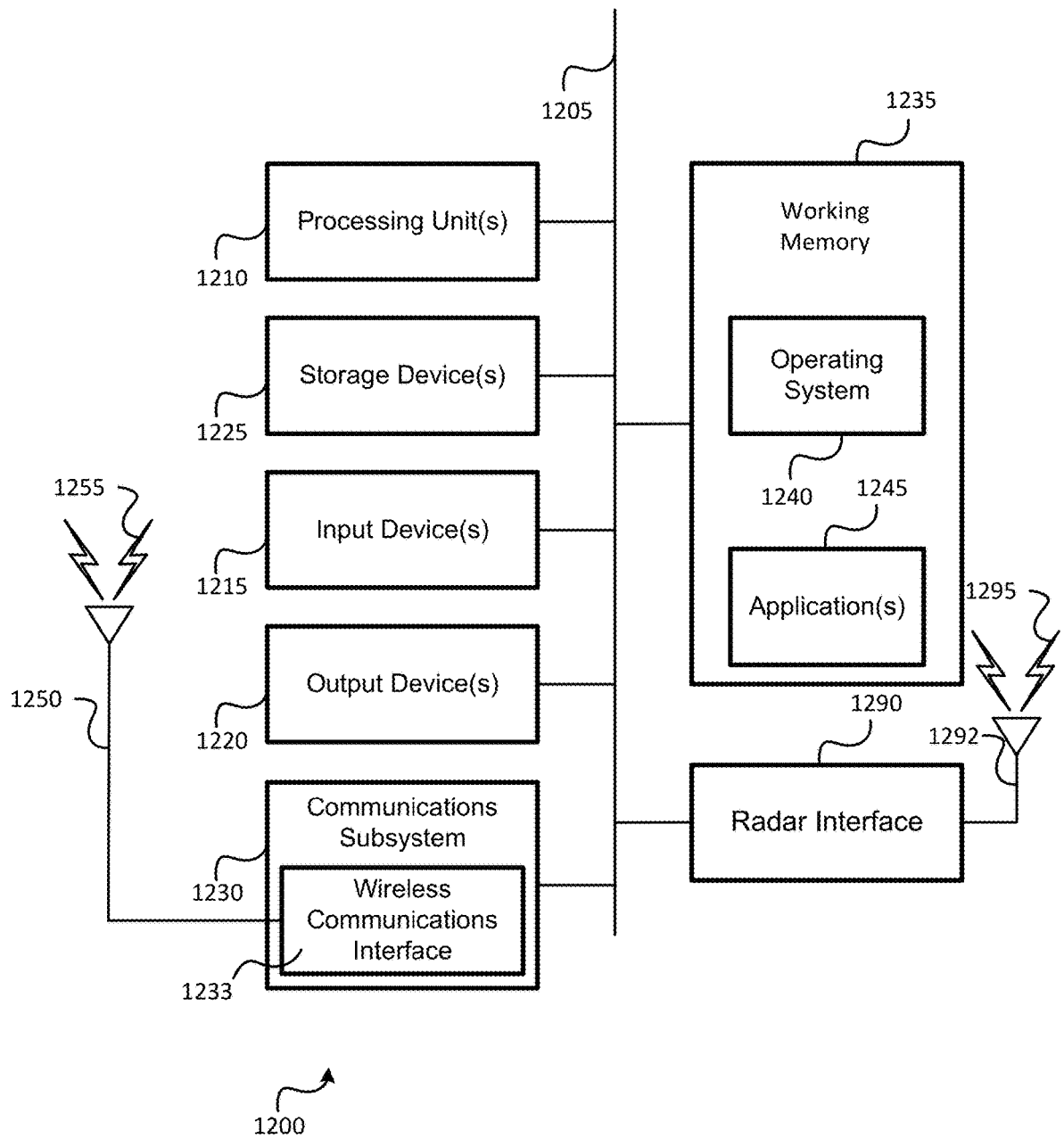
FIG. 12 is a block diagram of an embodiment of a computer system, which can be utilized in embodiments as described herein.

At block 910, the functionality comprises transmitting a first signal for a first duration. For example, the first signal 530 may be transmitted as described with respect to FIG. 5. As previously described, first signal power and duration (e.g., window of time) may be calculated based on the minimum distance range within which the device may not detect an object due to its close proximity to the device. The outer distance range, or maximum distance, can be calculated based on a maximum signal to noise ratio of the transmission signal, such that objects outside the minimum distance and within the outer distance for the first signal are detected based on their reflection of the first signal, as described in the examples shown in FIGS. 3-8. Means for performing functionality at block 910 may comprise an antenna, such as antenna 1092 of FIG. 10, antenna 1192 of FIG. 11, or antenna 1292 of FIG. 12, and a radar interface and/or transmit and/or receive processor such as radar interface 1090 of FIG. 10, radar interface 1190 of FIG. 11, radar interface 1290 of FIG. 12, and/or other components of a UE, computer system, and/or base station, as illustrated in FIGS. 10, 11, and/or 12. Calculations for the transmission of the signal may be performed by one or more processors based on instructions stored in memory of the devices as depicted in FIGS. 10, 11, and 12.

At block 920, the functionality comprises receiving a first reflection of the first signal from a first object during a second duration following the first duration. For example, the device may receive reflection signal 536 based on reflection of the first signal 530 from the first object 514 as described with respect to FIG. 5. Further, for example, the second duration may be reception window 605 as described with respect to FIG. 6. Means for performing functionality at block 910 may comprise an antenna, such as antenna 1092 of FIG. 10, antenna 1192 of FIG. 11, or antenna 1292 of FIG. 12, and a radar interface and/or transmit and/or receive processor such as radar interface 1090 of FIG. 10, radar interface 1190 of FIG. 11, radar interface 1290 of FIG. 12, and/or other components of a UE, computer system, and/or base station, as illustrated in FIGS. 10, 11, and/or 12.

At block 930, the functionality comprises transmitting a second signal for a third duration, wherein the third duration is longer than the first duration and follows the second duration. For example, the second signal 532 may be transmitted as described with respect to FIG. 5. The second signal power and duration are calculated based on the maximum range of the first signal and the maximum range of the second signal. The power of the second signal may be larger than the power of the first signal to ensure reflection signals are sufficiently strong based on the larger distance travelled to be detected during the second reception window. The duration of the second signal is longer than that of the first signal to ensure distinction between the first and second signal reflections. Means for performing functionality at block 910 may comprise an antenna, such as antenna 1092 of FIG. 10, antenna 1192 of FIG. 11, or antenna 1292 of FIG. 12, and a radar interface and/or transmit and/or receive processor such as radar interface 1090 of FIG. 10, radar interface 1190 of FIG. 11, radar interface 1290 of FIG. 12, and/or other components of a UE, computer system, and/or base station, as illustrated in FIGS. 10, 11, and/or 12. Calculations for the transmission of the signal may be performed by one or more processors based on instructions stored in memory of the devices as depicted in FIGS. 10, 11, and 12.

At block 940, the functionality comprises receiving a second reflection of the second signal from a second object during a fourth duration following the third duration. For example, the device may receive reflection signal 544 based on reflection of the second signal 532 from the second object 516 as described with respect to FIG. 5. Further, for example, the fourth duration may be reception window 705 as described with respect to FIG. 7. Thus, as described in the embodiments detailed herein, the first, second, third, and fourth durations may comprise successive durations, where one duration immediately follows the other. Means for performing functionality at block 910 may comprise an antenna, such as antenna 1092 of FIG. 10, antenna 1192 of FIG. 11, or antenna 1292 of FIG. 12, and a radar interface and/or transmit and/or receive processor such as radar interface 1090 of FIG. 10, radar interface 1190 of FIG. 11, radar interface 1290 of FIG. 12, and/or other components of a UE, computer system, and/or base station, as illustrated in FIGS. 10, 11, and/or 12.

At block 950, the functionality comprises determining positions of the first object and the second object based on the first reflection and the second reflection. Specifically, the time of arrival of the reflection signals may be used to calculate the distance between the device sending the transmission signal and the object from which the signal was reflected. Means for performing functionality at block 910 may comprise one or more processors based on instructions stored in memory of the devices as depicted in FIGS. 10, 11, and 12. As previously noted, the number of transmission signals and reception windows for identifying objects in ranges of distances from the transmitting device can be two or more and may be limited only by signal to noise ratio characteristics of the reflection signals due to the strength of the transmission signal and distance the signal travels.

Depending on desired functionality, the method may include one or more additional features, as described in the embodiments detailed previously with respect to FIGS. 3-8. For example, according to some embodiments, the first object is within a first distance of the device and the second object is between the first distance and a second distance of the device, the second distance being larger than the first distance. According to some embodiments, the first duration may be determined based on a minimum distance from the device that an object is detectable. Additionally or alternatively, the third duration may be determined based at least in part on the first duration, the power of a transmit antenna of the device, and/or a gain of the transmit antenna during the transmission of the second signal (e.g., using equation (3)). In some instances, a third reflection of the second signal from the second object may not be detectable. According to some embodiments, the first signal comprises a phase modulated continuous waveform. Additionally or alternatively, the device may comprise a full-duplex device or a half-duplex device. Additionally or alternatively, the device may comprise a monostatic radar.

FIG. 10 illustrates an embodiment of a UE 105, which can be utilized as described herein above (e.g., in association with FIGS. 3-9. For example, the UE 105 can perform one or more of the functions of the method shown in FIG. 9. It should be noted that FIG. 10 is meant only to provide a generalized illustration of various components, any or all of which may be utilized as appropriate. It can be noted that, in some instances, components illustrated by FIG. 10 can be localized to a single physical device and/or distributed among various networked devices, which may be disposed at different physical locations. Furthermore, as previously noted, the functionality of the UE discussed in the previously-described embodiments may be executed by one or more of the hardware and/or software components illustrated in FIG. 10.

The UE 105 is shown comprising hardware elements that can be electrically coupled via a bus 1005 (or may otherwise be in communication, as appropriate). The hardware elements may include a processing unit(s) 1010 which can include without limitation one or more general-purpose processors, one or more special-purpose processors (such as DSP chips, graphics acceleration processors, application specific integrated circuits (ASICs), and/or the like), and/or other processing structures or means. As shown in FIG. 10, some embodiments may have a separate DSP 1020, depending on desired functionality. Location determination and/or other determinations based on wireless communication may be provided in the processing unit(s) 1010 and/or wireless communication interface 1030 (discussed below). The UE 105 also can include one or more input devices 1070, which can include without limitation one or more keyboards, touch screens, touch pads, microphones, buttons, dials, switches, and/or the like; and one or more output devices 1015, which can include without limitation one or more displays (e.g., touch screens), light emitting diodes (LEDs), speakers, and/or the like.

The UE 105 may also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 105 to communicate with other devices as described in the embodiments above. The wireless communication interface 1030 may permit data and signaling to be communicated (e.g., transmitted and received) with a network, for example, via eNBs, gNBs, ng-eNBs, access points, various base stations and/or other access node types, TRPs, and/or other network components, computer systems, and/or any other electronic devices described herein. The communication can be carried out via one or more wireless communication antenna(s) 1032 that send and/or receive wireless signals 1034. According to some embodiments, the wireless communication antenna(s) 1032 may comprise a plurality of discrete antennas, antenna arrays, or any combination thereof.

Depending on desired functionality, the wireless communication interface 1030 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 105 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax (IEEE 802.16) network, and so on. A CDMA network may implement one or more RATs such as CDMA2000, WCDMA, and so on. CDMA2000 includes IS-95, IS-2000, and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project X3" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 105 can further include sensor(s) 1040. Sensors 1040 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 105 may also include a Global Navigation Satellite System (GNSS) receiver 1080 capable of receiving signals 1084 from one or more GNSS satellites using an antenna 1082 (which could be the same as antenna 1032). Positioning based on GNSS signal measurement can be utilized to complement and/or incorporate the techniques described herein. The GNSS receiver 1080 can extract a position of the UE 105, using conventional techniques, from GNSS SVs 190 of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1080 can be used with various augmentation systems (e.g., a Satellite Based Augmentation System (SBAS)) that may be associated with or otherwise enabled for use with one or more global and/or regional navigation satellite systems, such as, e.g., WAAS, EGNOS, Multi-functional Satellite Augmentation System (MSAS), and Geo Augmented Navigation system (GAGAN), and/or the like.

Embodiments of the UE 105 may also include a radar interface 1090. The radar interface 1090 may be a transceiver and may include signal transmission and signal reception processors. The radar interface 1090 may operate as a full-duplex system in some embodiments or may operate as a half-duplex system in some embodiments. The radar interface 1090 may be capable of transmitting and receiving signals 1094 using antenna 1092. The antenna 1092 may be a monostatic antenna in some embodiments. Object location and tracking based on radar measurements can be utilized based on the techniques described herein. As noted, the techniques for performing radar detection as described herein may be performed using mmWave and/or other communication technologies. Accordingly, in some embodiments, the radar interface 1090 may be integrated into and/or implemented by the wireless communication interface 1030.

The UE 105 may further include and/or be in communication with a memory 1060. The memory 1060 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the UE 105 also can comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the UE 105 (and/or processing unit(s) 1010 or DSP 1020 within UE 105). In an aspect, then such code and/or instructions can be used to configure and/or adapt a general purpose computer (or other device) to perform one or more operations in accordance with the described methods.

FIG. 11 illustrates an embodiment of a base station 120, which can be utilized as described herein above (e.g., in association with FIGS. 3-9. It should be noted that FIG. 11 is meant only to provide a generalized illustration of various components, any or all of which may be utilized as appropriate. In some embodiments, the base station 120 may correspond to a gNB, an ng-eNB, and/or (more generally) a TRP.

The base station 120 is shown comprising hardware elements that can be electrically coupled via a bus 1105 (or may otherwise be in communication, as appropriate). The hardware elements may include a processing unit(s) 1110 which can include without limitation one or more general-purpose processors, one or more special-purpose processors (such as DSP chips, graphics acceleration processors, ASICs, and/or the like), and/or other processing structure or means. As shown in FIG. 11, some embodiments may have a separate DSP 1120, depending on desired functionality. Location determination and/or other determinations based on wireless communication may be provided in the processing unit(s) 1110 and/or wireless communication interface 1130 (discussed below), according to some embodiments. The base station 120 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 120 might also include a wireless communication interface 1130, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 120 to communicate as described herein. The wireless communication interface 1130 may permit data and signaling to be communicated (e.g., transmitted and received) to UEs, other base stations/TRPs (e.g., eNBs, gNBs, and ng-eNBs), and/or other network components, computer systems, and/or any other electronic devices described herein. The communication can be carried out via one or more wireless communication antenna(s) 1132 that send and/or receive wireless signals 1134.

The base station 120 may also include a network interface 1180, which can include support of wireline communication technologies. The network interface 1180 may include a modem, network card, chipset, and/or the like. The network interface 1180 may include one or more input and/or output communication interfaces to permit data to be exchanged with a network, communication network servers, computer systems, and/or any other electronic devices described herein.

Embodiments of the base station 120 may also include a radar interface 1190. The radar interface 1190 may be a transceiver and may include signal transmission and signal reception processors. The radar interface 1190 may operate as a full-duplex system in some embodiments or may operate as a half-duplex system in some embodiments. The radar interface 1190 may be capable of transmitting and receiving signals 1194 using antenna 1192. The antenna 1192 may be a monostatic antenna in some embodiments. Object location and tracking based on radar measurements can be utilized based on the techniques described herein. Again, the techniques for performing radar detection as described herein may be performed using mmWave and/or other communication technologies. Accordingly, in some embodiments, the radar interface 1190 may be integrated into and/or implemented by the wireless communication interface 1130.

In many embodiments, the base station 120 may further comprise a memory 1160. The memory 1160 can include, without limitation, local and/or network accessible storage, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The memory 1160 of the base station 120 also may comprise software elements (not shown in FIG. 11), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1160 that are executable by the base station 120 (and/or processing unit(s) 1110 or DSP 1120 within base station 120). In an aspect, then such code and/or instructions can be used to configure and/or adapt a general purpose computer (or other device) to perform one or more operations in accordance with the described methods.

FIG. 12 is a block diagram of an embodiment of a computer system 1200, which may be used, in whole or in part, to provide the functions of one or more network components as described in the embodiments herein (e.g., location server 160 of FIGS. 3-9. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner. In addition, it can be noted that components illustrated by FIG. 12 can be localized to a single device and/or distributed among various networked devices, which may be disposed at different geographical locations.

The computer system 1200 is shown comprising hardware elements that can be electrically coupled via a bus 1205 (or may otherwise be in communication, as appropriate). The hardware elements may include processing unit(s) 1210, which may comprise without limitation one or more general-purpose processors, one or more special-purpose processors (such as digital signal processing chips, graphics acceleration processors, and/or the like), and/or other processing structure, which can be configured to perform one or more of the methods described herein. The computer system 1200 also may comprise one or more input devices 1215, which may comprise without limitation a mouse, a keyboard, a camera, a microphone, and/or the like; and one or more output devices 1220, which may comprise without limitation a display device, a printer, and/or the like.

The computer system 1200 may further include (and/or be in communication with) one or more non-transitory storage devices 1225, which can comprise, without limitation, local and/or network accessible storage, and/or may comprise, without limitation, a disk drive, a drive array, an optical storage device, a solid-state storage device, such as a RAM and/or ROM, which can be programmable, flash-updateable, and/or the like. Such storage devices may be configured to implement any appropriate data stores, including without limitation, various file systems, database structures, and/or the like. Such data stores may include database(s) and/or other data structures used store and administer messages and/or other information to be sent to one or more devices via hubs, as described herein.

The computer system 1200 may also include a communications subsystem 1230, which may comprise wireless communication technologies managed and controlled by a wireless communication interface 1233, as well as wired technologies (such as Ethernet, coaxial communications, universal serial bus (USB), and the like). The wireless communication interface 1233 may send and receive wireless signals 1255 (e.g., signals according to 5G NR or LTE) via wireless antenna(s) 1250. Thus the communications subsystem 1230 may comprise a modem, a network card (wireless or wired), an infrared communication device, a wireless communication device, and/or a chipset, and/or the like, which may enable the computer system 1200 to communicate on any or all of the communication networks described herein to any device on the respective network, including a User Equipment (UE), base stations and/or other TRPs, and/or any other electronic devices described herein. Hence, the communications subsystem 1230 may be used to receive and send data as described in the embodiments herein.

Embodiments of the computer system 1200 may also include a radar interface 1290. The radar interface 1290 may be a transceiver and may include transmission and reception processors. The radar interface 1290 may operate as a full-duplex system in some embodiments or may operate as a half-duplex system in some embodiments. The radar interface 1290 may be capable of transmitting and receiving signals 1294 using antenna 1292. The antenna 1292 may be a monostatic antenna in some embodiments. Object location and tracking based on radar measurements can be utilized with the techniques described herein. Again, the techniques for performing radar detection as described herein may be performed using mmWave and/or other communication technologies. Accordingly, in some embodiments, the radar interface 1290 may be integrated into and/or implemented by the wireless communication interface 1233.

In many embodiments, the computer system 1200 will further comprise a working memory 1235, which may comprise a RAM or ROM device, as described above. Software elements, shown as being located within the working memory 1235, may comprise an operating system 1240, device drivers, executable libraries, and/or other code, such as one or more applications 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processing unit within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 1225 described above. In some cases, the storage medium might be incorporated within a computer system, such as computer system 1200. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method for radar detection of objects, the method comprising: transmitting, by a device, a first signal for a first duration; receiving, by the device, a first reflection of the first signal from a first object during a second duration following the first duration; transmitting, by the device, a second signal for a third duration, wherein the third duration is longer than the first duration and follows the second duration; receiving, by the device, a second reflection of the second signal from a second object during a fourth duration following the third duration; and determining, by the device, positions of the first object and the second object based on the first reflection and the second reflection.

Clause 2: The method of clause 1, wherein the first object is within a first distance of the device and the second object is between the first distance and a second distance of the device, the second distance being larger than the first distance.

Clause 3: The method of any of clauses 1-2 wherein the first duration is determined based at least in part on a minimum distance from the device that an object is detectable.

Clause 4: The method of any of clauses 1-3 wherein the third duration is determined based at least in part on the first duration.

Clause 5: The method of any of clauses 1-4 wherein the third duration is determined based at least in part on a power of a transmit antenna of the device, a gain of the transmit antenna during the transmission of the second signal.

Clause 6: The method of any of clauses 1-5 wherein the first signal comprises a phase modulated continuous waveform.

Clause 7: The method of any of clauses 1-6 wherein the device comprises a full-duplex device.

Clause 8: The method of any of clauses 1-7 wherein the device comprises a half-duplex device.

Clause 9: The method of any of clauses 1-8 wherein the device comprises a monostatic radar.

Clause 10: A device for radar detection of objects, the device comprising: a transceiver; a memory; and one or more processors communicatively coupled with the transceiver and the memory, wherein the one or more processors are configured to: transmit, via the transceiver, a first signal for a first duration; receive, via the transceiver, a first reflection of the first signal from a first object during a second duration following the first duration; transmit, via the transceiver, a second signal for a third duration, wherein the third duration is longer than the first duration and follows the second duration; receive, via the transceiver, a second reflection of the second signal from a second object during a fourth duration following the third duration; and determine positions of the first object and the second object based on the first reflection and the second reflection.

Clause 11: The device of clause 10, wherein the one or more processors are configured to determine the position of the first object is within a first distance of the device and determine the position of the second object is between the first distance and a second distance of the device, the second distance being larger than the first distance.

Clause 12: The device of any of clauses 10-11 wherein the first duration the first duration is based at least in part on a minimum distance from the device that an object is detectable.

Clause 13: The device of any of clauses 10-12 wherein the third duration is based at least in part on the first duration.

Clause 14: The device of any of clauses 10-13 wherein the third duration is based at least in part on a power of a transmit antenna of the device, a gain of the transmit antenna during the transmission of the second signal.

Clause 15: The device of any of clauses 10-14 wherein, to transmit the first signal, the one or more processors are configured to transmit a phase modulated continuous waveform.

Clause 16: The device of any of clauses 10-15 wherein the device comprises a full-duplex device.

Clause 17: The device of any of clauses 10-16 wherein the device comprises a half-duplex device.

Clause 18: The device of any of clauses 10-17 wherein the device comprises a monostatic radar.

Clause 19: An apparatus for radar detection of objects, the apparatus comprising: means for transmitting a first signal for a first duration; means for receiving a first reflection of the first signal from a first object during a second duration following the first duration; means for transmitting a second signal for a third duration, wherein the third duration is longer than the first duration and follows the second duration; means for receiving a second reflection of the second signal from a second object during a fourth duration following the third duration; and means for determining positions of the first object and the second object based on the first reflection and the second reflection.

Clause 20: The apparatus of clause 19, wherein the first duration based at least in part on a minimum distance from the apparatus that an object is detectable.

Clause 21: The apparatus of any of clauses 19-20 wherein the third duration is based at least in part on the first duration.

Clause 22: The apparatus of any of clauses 19-21 wherein the third duration is based at least in part on a power of a transmit antenna of the apparatus, a gain of the transmit antenna during the transmission of the second signal.

Clause 23: The apparatus of any of clauses 19-22 wherein the means for transmitting the first signal comprise means for transmitting a phase modulated continuous waveform.

Clause 24: The apparatus of any of clauses 19-23 wherein the apparatus comprises a full-duplex device.

Clause 25: The apparatus of any of clauses 19-24 wherein the apparatus comprises a half-duplex device.

Clause 26: The apparatus of any of clauses 19-25 wherein the apparatus comprises a monostatic radar.

Clause 27: A non-transitory computer-readable medium storing instructions for radar detection of objects, the instructions comprising code for: transmitting, from a device, a first signal for a first duration; receiving a first reflection of the first signal from a first object during a second duration following the first duration; transmitting a second signal for a third duration, wherein the third duration is longer than the first duration and follows the second duration; receiving a second reflection of the second signal from a second object during a fourth duration following the third duration; and determining positions of the first object and the second object based on the first reflection and the second reflection.

Clause 28: The computer-readable medium of clause 27, wherein the first duration is determined based at least in part on a minimum distance from the device that an object is detectable.

Clause 29: The computer-readable medium of any of clauses 27-28 wherein the third duration is based at least in part on the first duration.

Clause 30: The computer-readable medium of any of clauses 27-29 wherein the third duration is based at least in part on a power of a transmit antenna of the device, a gain of the transmit antenna during the transmission of the second signal.

What is claimed is:

1. A method for radar detection of objects in accordance with a transmission/reception configuration, the method comprising:
   transmitting, by a device, a first signal for a first duration corresponding to a first transmission window;
   receiving, by the device, a first reflection of the first signal from a first object during a second duration following the first duration, wherein the second duration defines a first detection range for the first signal and corresponds to a first reception window;
   transmitting, by the device, a second signal for a third duration, wherein:
      the third duration is longer than the first duration, follows the second duration, and corresponds to a second transmission window, and
      the third duration is determined based at least in part on a transmission range determined from a signal to noise ratio of the first signal;
   receiving, by the device, a second reflection of the second signal from a second object during a fourth duration following the third duration, wherein the fourth duration defines a second detection range for the second signal different from the first detection range and corresponds to a second reception window, wherein a third reflection of the second signal from the first object cannot be received entirely by the device during the second reception window, wherein according to the transmission/reception configuration, the first and second transmission windows are within a plurality of transmission windows of the transmission/reception configuration, wherein the first and second reception windows are within a plurality of reception windows of the transmission/reception configuration, and wherein the plurality of transmission windows and the plurality of reception windows do not overlap in time; and
   determining, by the device, positions of the first object and the second object based on the first reflection and the second reflection.

2. The method of claim 1, wherein the first object is within a first distance of the device and the second object is between the first distance and a second distance of the device, the second distance being larger than the first distance.

3. The method of claim 1, wherein the first duration is determined based at least in part on a minimum distance from the device that an object is detectable.

4. The method of claim 1, wherein the third duration is further determined based at least in part on the first duration.

5. The method of claim 1, wherein the first signal comprises a phase modulated continuous waveform.

6. The method of claim 1, wherein the device comprises a full-duplex device.

7. The method of claim 1, wherein the device comprises a half-duplex device.

8. The method of claim 1, wherein the device comprises a monostatic radar.

9. The method of claim 1, further comprising, prior to transmitting the second signal by the device, determining a time for transmitting the second signal based at least in part on a length of the first duration.

10. A device for radar detection of objects in accordance with a transmission/reception configuration, the device comprising:
   a transceiver;
   a memory; and
   one or more processors communicatively coupled with the transceiver and the memory, wherein the one or more processors are configured to:
      transmit, via the transceiver, a first signal for a first duration corresponding to a first transmission window;
      receive, via the transceiver, a first reflection of the first signal from a first object during a second duration following the first duration, wherein the second duration defines a first detection range for the first signal and corresponds to a first reception window;
      transmit, via the transceiver, a second signal for a third duration, wherein:
         the third duration is longer than the first duration, follows the second duration, and corresponds to a second transmission window, and
         the third duration is determined based at least in part on a maximum range determined from a signal to noise ratio of the first signal;

receive, via the transceiver, a second reflection of the second signal from a second object during a fourth duration following the third duration, wherein the fourth duration defines a second detection range for the second signal different from the first detection range and corresponds to a second reception window, wherein a third reflection of the second signal from the first object cannot be received entirely by the device during the second reception window, wherein according to the transmission/reception configuration, the first and second transmission windows are within a plurality of transmission windows of the transmission/reception configuration, wherein the first and second reception windows are within a plurality of reception windows of the transmission/reception configuration, and wherein the plurality of transmission windows and the plurality of reception windows do not overlap in time; and determine positions of the first object and the second object based on the first reflection and the second reflection.

11. The device of claim 10, wherein the one or more processors are configured to determine the position of the first object is within a first distance of the device and determine the position of the second object is between the first distance and a second distance of the device, the second distance being larger than the first distance.

12. The device of claim 10, wherein the first duration is based at least in part on a minimum distance from the device that an object is detectable.

13. The device of claim 10, wherein the third duration is further based at least in part on the first duration.

14. The device of claim 10, wherein, to transmit the first signal, the one or more processors are configured to transmit a phase modulated continuous waveform.

15. The device of claim 10, wherein the device comprises a full-duplex device.

16. The device of claim 10, wherein the device comprises a half-duplex device.

17. The device of claim 10, wherein the device comprises a monostatic radar.

18. The device of claim 10, wherein the one or more processors are further configured to determine a time to transmit the second signal based at least in part on a length of the first duration.

19. An apparatus for radar detection of objects in accordance with a transmission/reception configuration, the apparatus comprising:

means for transmitting a first signal for a first duration corresponding to a first transmission window;

means for receiving a first reflection of the first signal from a first object during a second duration following the first duration, wherein the second duration defines a first detection range for the first signal and corresponds to a first reception window;

means for transmitting a second signal for a third duration, wherein:
the third duration is longer than the first duration, follows the second duration, and corresponds to a second transmission window, and
the third duration is determined based at least in part on a maximum range determined from a signal to noise ratio of the first signal;

means for receiving a second reflection of the second signal from a second object during a fourth duration following the third duration, wherein the fourth duration defines a second detection range for the second signal different from the first detection range and corresponds to a second reception window wherein a third reflection of the second signal from the first object cannot be received entirely by the apparatus during the second reception window, wherein according to the transmission/reception configuration, the first and second transmission windows are within a plurality of transmission windows of the transmission/reception configuration, wherein the first and second reception windows are within a plurality of reception windows of the transmission/reception configuration, and wherein the plurality of transmission windows and the plurality of reception windows do not overlap in time; and means for determining positions of the first object and the second object based on the first reflection and the second reflection.

20. The apparatus of claim 19, wherein the first duration based at least in part on a minimum distance from the apparatus that an object is detectable.

21. The apparatus of claim 19, wherein the third duration is further based at least in part on the first duration.

22. The apparatus of claim 19, wherein the means for transmitting the first signal comprise means for transmitting a phase modulated continuous waveform.

23. The apparatus of claim 19, wherein the apparatus comprises a full-duplex device.

24. The apparatus of claim 19, wherein the apparatus comprises a half-duplex device.

25. The apparatus of claim 19, wherein the apparatus comprises a monostatic radar.

26. The apparatus of claim 19, further comprising means for determining a time to transmit the second signal based at least in part on a length of the first duration.

27. A non-transitory computer-readable medium storing instructions for radar detection of objects in accordance with a transmission/reception configuration, the instructions comprising code for:

transmitting, from a device, a first signal for a first duration corresponding to a first transmission window;

receiving a first reflection of the first signal from a first object during a second duration following the first duration, wherein the second duration defines a first detection range for the first signal and corresponds to a first reception window;

transmitting a second signal for a third duration, wherein:
the third duration is longer than the first duration, follows the second duration, and corresponds to a second transmission window, and
the third duration is determined based at least in part on a maximum range determined from a signal to noise ratio of the first signal;

receiving a second reflection of the second signal from a second object during a fourth duration following the third duration, wherein the fourth duration defines a second detection range for the second signal different from the first detection range and corresponds to a second reception window wherein a third reflection of the second signal from the first object cannot be received entirely by the device during the second reception window, wherein according to the transmission/reception configuration, the first and second transmission windows are within a plurality of transmission windows of the transmission/reception configuration, wherein the first and second reception windows are within a plurality of reception windows of the transmission/reception configuration, and wherein the plurality of transmission windows and the plurality of reception windows do not overlap in time; and determining positions of the first object and the second object based on the first reflection and the second reflection.

28. The computer-readable medium of claim 27, wherein the first duration is determined based at least in part on a minimum distance from the device that an object is detectable.

29. The computer-readable medium of claim 27, wherein the third duration is further based at least in part on the first duration.

30. The computer-readable medium of claim 27, wherein the instructions further comprise code for determining a time to transmit the second signal based at least in part on a length of the first duration.

\* \* \* \* \*